US012483479B1

(12) United States Patent
Alawad

(10) Patent No.: US 12,483,479 B1
(45) Date of Patent: Nov. 25, 2025

(54) SYSTEM AND METHOD FOR A CLOUDIFICATION SERVICE MODEL FOR NEXT O-RAN GENERATION

(71) Applicant: IMAM MOHAMMAD IBN SAUD ISLAMIC UNIVERSITY, Riyadh (SA)

(72) Inventor: Mohamad A. Alawad, Riyadh (SA)

(73) Assignee: IMAM MOHAMMAD IBN SAUD ISLAMIC UNIVERSITY, Riyadh (SA)

( * ) Notice: Subject to any disclaimer, the term of this patent is extended or adjusted under 35 U.S.C. 154(b) by 0 days.

(21) Appl. No.: 19/265,938

(22) Filed: Jul. 10, 2025

(51) Int. Cl.
*H04L 41/0895* (2022.01)
*H04L 41/0816* (2022.01)
*H04W 28/16* (2009.01)

(52) U.S. Cl.
CPC ...... *H04L 41/0895* (2022.05); *H04L 41/0816* (2013.01); *H04W 28/16* (2013.01)

(58) Field of Classification Search
CPC . H04L 41/0816; H04L 41/0895; H04W 28/16
See application file for complete search history.

(56) References Cited

U.S. PATENT DOCUMENTS

| | | | | |
|---|---|---|---|---|
| 10,856,217 | B1 * | 12/2020 | Young | H04W 48/16 |
| 11,737,122 | B1 * | 8/2023 | Cai | H04W 72/53 |
| | | | | 370/259 |
| 12,143,263 | B2 * | 11/2024 | Bhangu | H04L 41/052 |
| 12,200,498 | B2 * | 1/2025 | Chou | H04W 16/10 |
| 12,245,052 | B2 * | 3/2025 | Narasimha Swamy | |
| | | | | H04L 41/145 |
| 12,301,421 | B2 * | 5/2025 | Luthra | H04L 41/0894 |
| 2023/0007538 | A1 * | 1/2023 | Parikh | H04W 8/02 |
| 2023/0308959 | A1 * | 9/2023 | Shankaranarayanan | |
| | | | | H04W 36/08 |
| 2023/0318794 | A1 * | 10/2023 | Shankaranarayanan | |
| | | | | H04W 72/0453 |
| | | | | 370/329 |

(Continued)

FOREIGN PATENT DOCUMENTS

WO   WO-2024182031 A1 *   9/2024   ............ H04W 24/02

OTHER PUBLICATIONS

Ravi Chamarty et al., "From Blueprint to Reality: O-RAN RIC Unveiled", Rakuten Symphony, 12 Pages.

*Primary Examiner* — G. C. Neurauter, Jr.
(74) *Attorney, Agent, or Firm* — Oblon, McClelland, Maier & Neustadt, L.L.P.

(57) ABSTRACT

A system and method for minimizing communication latency and resources in cloud, Open and/or virtual based radio access network (RAN) includes a RAN Node including antennas, radio units, and baseband, O-CU and O-DU units. The antennas receive data transmissions from user devices and send the data to a radio unit. A baseband unit sends data to a cloud platform, and sends data received from the cloud platform to the radio unit. The system includes a near real time RAN intelligent controller (Near-RT-RIC) for near-RT control of RAN logical/hardware resource allocation; and a service management and orchestration (SMO) framework including a Open Intelligent Cloud Controller (O-ICC) for controlling operations in the cloud platform; a non-real-time RIC (Non-RT-RIC) for non-real-time control of the RAN logical/hardware resource allocation; and the open cloud interface to enable direct communication of messages between the O-ICC and the Non-RT-RIC and Near-RT-RIC.

16 Claims, 11 Drawing Sheets

FIG. 3

(56) References Cited

U.S. PATENT DOCUMENTS

| | | |
|---|---|---|
| 2023/0345516 A1 | 10/2023 | Cai et al. |
| 2024/0111594 A1 | 4/2024 | Ravindran |
| 2024/0196177 A1* | 6/2024 | Parasher ............... H04W 24/02 |
| 2024/0224118 A1 | 7/2024 | Trivedi |
| 2024/0236766 A1* | 7/2024 | Shete ................. H04L 41/0894 |
| 2024/0250878 A1 | 7/2024 | Luthra et al. |
| 2024/0251254 A1* | 7/2024 | Luthra ................. H04W 24/02 |
| 2024/0267794 A1* | 8/2024 | Shakkottai ............ G06N 3/0455 |
| 2024/0354654 A1* | 10/2024 | Ying ....................... G06N 20/00 |
| 2024/0422516 A1* | 12/2024 | Dehghan ............... H04W 28/16 |
| 2025/0039054 A1* | 1/2025 | Aijaz ...................... H04L 41/40 |
| 2025/0097825 A1* | 3/2025 | Chandrashekar ..... H04W 92/14 |
| 2025/0126016 A1* | 4/2025 | Shete ..................... H04L 41/40 |
| 2025/0247291 A1* | 7/2025 | Shete ................... H04W 24/02 |

* cited by examiner

SYSTEM AND METHOD FOR A CLOUDIFICATION SERVICE MODEL FOR NEXT O-RAN GENERATION

BACKGROUND

Technical Field

The present disclosure is directed to wireless communication networks, and more particularly to systems and methods for implementing a cloudification service model for managing and optimizing cloud-based operations in open radio access network (O-RAN) architectures.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Open RAN, or Open Radio Access Network (O-RAN), is a shift in the way of designing and deploying radio access network infrastructure in the telecommunications industry. Open radio access network (O-RAN) architecture represents a significant evolution in the deployment of radio access networks, focusing on disaggregating traditional network components and enabling interoperability across vendor platforms. O-RAN leaverages open interfaces and standardized components to enable automation, orchestration, and intelligent control within a RAN. O-RAN Alliance has developed several key interfaces and entities such as a Service Management and Orchestration (SMO), RAN Intelligent Controllers (RICs), and cloud-based infrastructures (O-Cloud), to support instantiation, management, and scaling of O-RAN components.

However, with the increasing adoption of public cloud infrastructures, such as Google Cloud Platform, Amazon Web Services, and Microsoft Azure, to host the O-RAN components, the complexity of managing the instantiation, updating, and scaling operations across diverse cloud environments has increased. These operations, collectively referred to as "cloudification loops," must satisfy stringent requirements for latency, reliability, and scalability to ensure optimal RAN performance. Despite these advancements, existing O-RAN implementations primarily focus on management and orchestration of the O-RAN components and do not provide a comprehensive solution for dynamically controlling or optimizing underlying cloud operations.

Specifically, current O-RAN systems lack an embedded control loop to govern cloud-layer operations during essential lifecycle events, such as the deployment, update, or scaling of network functions (NFs). The absence of this integrated feedback mechanism within the O-RAN architecture limits the ability to optimize resource usage, reduce deployment latency, and enhance platform-level intelligence across heterogeneous cloud environments. Additionally, current O-RAN implementations lack a programmable and extensible control entity capable of hosting platform-aware logic for optimizing the cloud operations, particularly in multi-cloud deployments or scenarios where fine-grained configuration of O-RAN services is required.

Accordingly, it is one object of the present disclosure to provide systems and methods that enhance an O-RAN cloudification lifecycle, provide intelligent optimization of cloud control loops, enables flexible deployment and scaling of O-RAN functions, and introduces seamless integration with existing O-RAN intelligent components. An object of the present disclosure is an intelligent entity to handle the O-cloud control and optimization using cloud Apps and an OC1 interface to communicate efficiently with the Near-RT and Non-RT RIC.

SUMMARY

In an exemplary embodiment, a system for minimizing communication latency in a cloud-based radio access network (RAN). The system includes a RAN Node including one or more antennas, one or more radio units, and one or more baseband units. The one or more antennas receive data transmissions from a plurality of user devices and send the data to a radio unit of the one or more radio units. The radio unit converts a signal from an antenna of the one or more antennas into a digital format that a baseband unit can understand. The baseband unit of the one or more baseband units sends data from the RAN Node to a cloud platform, and sends data received from the cloud platform to the radio unit for transmission. The system further includes a near real time RAN intelligent controller (Near-RT-RIC) for near-RT control of logical/hardware resource allocation in the RAN Node. The system further includes a service management and orchestration (SMO) framework including: a Open Intelligent Cloud Controller (O-ICC) for controlling operations in the cloud platform. The SMO framework further includes a non-real-time RIC (Non-RT-RIC) for non real-time control of the RAN logical/hardware resource allocation. The SMO framework further includes an open cloud interface (OC1 Interface) to enable direct communication of messages between the Open Intelligent Cloud Controller (O-ICC) and both the Non-RT-RIC and the Near-RT-RIC.

In another exemplary embodiment, a method of minimizing communication latency in a cloud-based radio access network (RAN) is disclosed. The method includes communicating wirelessly between user devices and a baseband unit in a RAN Node. The method further includes sending data from the baseband unit to a cloud platform. The method further includes controlling, by a Open Intelligent Cloud Controller (O-ICC), operations in the cloud platform. The method further includes controlling, by a non-real-time RAN intelligent controller (Non-RT-RIC), RAN logical/hardware resource allocation in non real-time. The method further includes controlling, by a near real time RAN intelligent controller (Near-RT-RIC), the RAN logical/hardware resource allocation in near real-time. The method further includes directly communicating, using an open cloud interface (OC1 Interface), messages between the Open Intelligent Cloud Controller (O-ICC) and both the Non-RT-RIC and the Near-RT-RIC.

The foregoing general description of the illustrative embodiments and the following detailed description thereof are merely exemplary aspects of the teachings of this disclosure, and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

Figure 1:
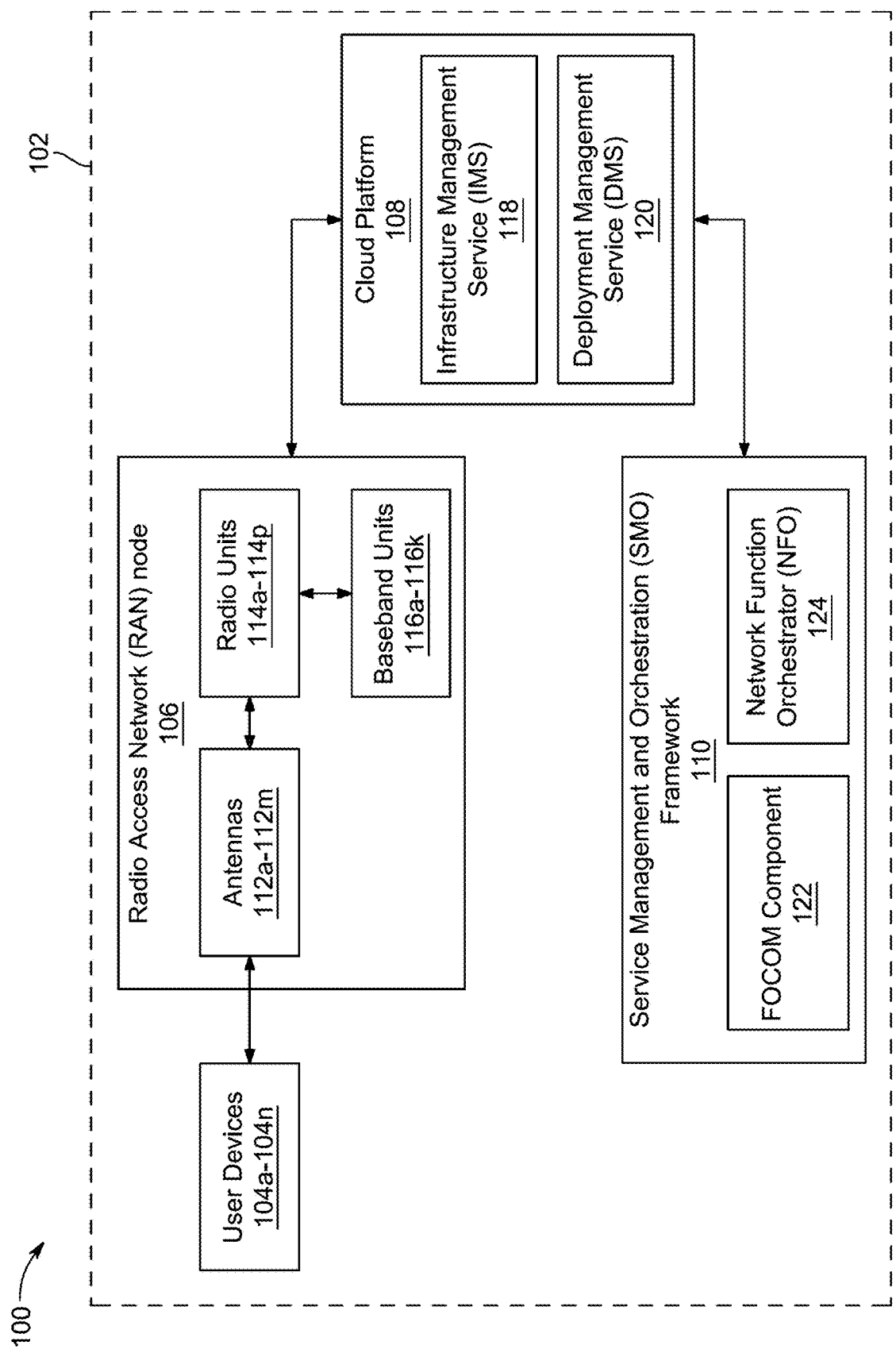
FIG. 1 illustrates a block diagram of a system for minimizing communication latency in one or more of a cloud, Open and or virtual based radio access network RAN (C/O/v-RAN), according to certain embodiments.

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

Aspects of this disclosure are directed to a system and method for intelligent control and optimization of cloud-based operations within an Open Radio Access Network (O-RAN) architecture through a cloudification service model. The present disclosure includes a control entity such as a Open Intelligent Cloud Controller (O-ICC), one or more cloud Apps (o-cApps), and an open cloud interface (OC1 Interface). Conventional O-RAN frameworks face challenges in managing cloudification loops for deployment, scaling, and software updates across heterogeneous cloud platforms (e.g., Amazon Web Services (AWS), Google Cloud), leading to inefficiencies, increased latency, and limited adaptability.

The present disclosure introduces a control architecture referred to as a cloudification service model architecture in which the O-ICC dynamically manages cloud platform behaviors by orchestrating control loops for pre-deployment, software updates, and network function (NF) scale-out operations. The O-ICC hosts modular o-cApps tailored for specific customers and cloud environments, enabling policy-driven optimization and cloud-specific procedures. To facilitate seamless coordination across the O-RAN architecture, the OC1 interface allows direct interaction with both near real time RAN intelligent controller (Near-RT-RIC) and non real-time RIC (Non-RT-RIC) entities. Thus, the cloudification service model architecture enhances network performance, reduces operational overhead, and improves deployment agility while maintaining compliance with O-RAN Alliance specifications.

FIG. 1 illustrates a block diagram of a system 100 for minimizing communication latency in one or more of a cloud, Open and/or virtual based radio access network (C/O/v-RAN) 102, according to certain embodiments. As used herein, the term "C-RAN 102" refers to a modern radio access network architecture that centralizes a processing of baseband units 116a-116k by moving the baseband units 116a-116k from traditional, distributed base stations into a centralized cloud infrastructure. In a setup of the C-RAN 102, radio units (RUs) 114a-114p remain at cell sites, while the baseband units 116a-116k are virtualized and hosted on centralized cloud data centers. This centralized and virtualized approach enables more efficient resource allocation, lower latency, simplified network management, improved scalability, and better support for advanced features like network slicing (that allows multiple virtual networks to run on a shared physical infrastructure) and AI-driven orchestration (that uses artificial intelligence and machine learning algorithms to automate and optimize the management of network resources, services, and functions across complex, dynamic cloud and telecom environments).

The system 100 includes user devices 104a-104n (hereinafter collectively referred to as the user devices 104 and individually referred to as the user device 104), C-RAN components such as a RAN node 106 (hereinafter multiple RAN nodes collectively referred to as RAN nodes 106 and individual RAN node referred to as the RAN node 106), a cloud platform 108 and a service management and orchestration (SMO) framework 110.

The user device 104 is configured to wirelessly communicate with one or more components of the RAN node 106 through a wireless transceiver system. In an embodiment, the wireless transceiver system may include, but is not limited to, a radio frequency (RF) front-end module, a modem, a transceiver integrated circuit (IC). In a preferred embodiment, the wireless transceiver system includes an antenna that serves as a physical interface for sending and receiving RF signals. For instance, the user device 104 may include a transmitter and a receiver (i.e., components of the wireless transceiver system) to send and receive data in the form of the RF signals, by utilizing wireless communication technologies such as, but not limited to, wireless fidelity (Wi-Fi), Bluetooth, or cellular standards. The data may be, for example, voice, video, internet data (e.g., hypertext transfer protocol (HTTP) requests, voice over internet protocol (VoIP) packets, video streams), control messages for managing communication session (e.g., radio resource control (RRC) messages, session establishment or modification requests), status information of the user device 104 (e.g., supported bandwidth, signal strength, location information), and so forth. In an exemplary embodiment, the antenna works in conjunction with the components of the wireless transceiver system to facilitate wireless exchange between the user device 104 and the RAN node 106.

In an embodiment, the user device 104 is configured to initiate control operations, such as, but not limited to, requesting software updates, interacting with orchestration functions, or transmitting application-specific data to the RAN node 106. In some embodiments, the user device 104 can also be used by operators (e.g., network administrators)

to trigger lifecycle management actions or orchestration procedures, such as updating, deploying, or scaling network functions (NFs) or cloud-native applications. The user device 104 may be, but is not limited to, a mobile device, a smart phone, a tablet, a portable computer, a laptop, a desktop, a smart device, and so forth. Embodiments of the present disclosure are intended to include or otherwise cover any type of the user device 104, including known, related art and/or later developed technologies.

The RAN node 106 is a functional unit within the C-RAN 102, and configured to provide wireless connectivity between the user devices 104 and the cloud platform 108. The RAN node 106 is adapted to perform various tasks, such as, but not limited to, radio signal processing, radio resource allocation, radio resource scheduling, data forwarding. In an embodiment, the RAN node 106 may be of any type, such as, but not limited to, a next generation Node B (gNB), an evolved Node B (eNB), a distributed unit, a central unit. Embodiments of the present disclosure are intended to include or otherwise cover any type of the RAN node 106, including known related art and/or later developed technologies. The RAN node 106 includes one or more antennas 112a-112m (hereinafter collectively referred to as the antennas 112 and individually referred to as the antenna 112), the one or more radio units 114a-114p (hereinafter collectively referred to as the radio units 114 and individually referred to as the radio unit 114) and the one or more baseband units 116a-116k (hereinafter collectively referred to as the baseband units 116 and individually referred to as the baseband unit 116).

The antennas 112 are configured to receive data transmissions from the user devices 104 as a signal through the wireless communication technologies. For instance, the user devices 104 send the RF signal carrying the data to the antennas 112, which are tuned to specific frequencies based on a communication protocol (e.g., Wi-Fi or long-term evolution (LTE)). The antennas 112 then capture the transmitted signal and convert the signal from an electromagnetic wave signal (i.e., RF signal) into an electrical signal to be sent to the associated radio units 114 or the baseband units 116 for further processing.

In an exemplary embodiment, the antenna 112 converts the RF signal into the electrical signal through an electromagnetic induction. An antenna structure, which includes conductive elements (such as metal rods or wires), interacts with the RF signal. When the oscillating electric and magnetic fields of the RF signal hit the antenna 112, the conductive elements of the antenna 112 cause electrons to move within the material, creating an alternating current (AC) that mirrors the frequency and characteristics of the incoming RF signal. This AC electrical signal is then sent to the associated radio unit 114 or the baseband unit 116 for further processing. The antennas 112 may be of any type such as, but is not limited to, dipole antennas, patch antennas, omnidirectional antennas, and others commonly used in communication technologies.

The radio unit 114 is configured to convert the electrical signal received from the corresponding antenna 112 into a digital format that the baseband unit 116 can understand. The electrical signal received from the antenna 112 may be an analog signal, which could be weak and require amplification. In an embodiment, the radio unit 114 amplifies the received signal using an amplifier circuit (such as a low-noise amplifier (LNA)) to boost signal strength before transmitting the signal to an analog-to-digital converter (ADC) of the radio unit 114. The radio unit 114 then samples a continuous analog signal at discrete intervals and quantizes each sample into a digital value. This conversion process transforms the analog signal into the digital format.

Once converted, the radio unit 114 transmits the digital signal to the baseband unit 116 for further processing. The radio units 114 may be of different types, such as remote radio units (RRUs), integrated radio units (IRUs). The RRUs perform signal conversion and amplification outside of a base station, while the IRUs perform the signal conversion and amplification within the base station itself.

The baseband unit 116 is responsible for processing the digital signals received from the radio unit 114 and then transmitting the processed data to the cloud platform 108. The baseband unit 116 is also responsible for transferring data received from the cloud platform 108 to the radio unit 114. In an exemplary embodiment, the baseband unit 116 is configured to perform various tasks on the received digital signal, such as signal decoding, modulation, and demodulation. The baseband unit 116 also performs critical functions such as, but not limited to, error correction, packetization, and handling various communication protocols required for transmission to the cloud platform 108.

In an embodiment, the baseband unit 116 is configured to transmit the processed digital data to the cloud platform 108 through a high-speed backhaul network connection. As used herein, the term "high-speed backhaul network connection" refers to a communication infrastructure that provides necessary data transfer between the baseband unit 116 and the cloud platform 108. The high-speed backhaul network connection is designed to support large volumes of data with minimal latency. Examples of high-speed backhaul technologies include, but are not limited to, fiber-optic connections, microwave links, advanced wireless technologies like millimeter-wave (mmWave) links. These connections ensure that the processed digital data from the RAN node 106 is efficiently transmitted to the cloud platform 108 for processing and further management. In an embodiment, the baseband units 116 may be used in different configurations, such as, but not limited to, centralized baseband units (cBBUs), Open-Central Units (O-CUs), distributed baseband units (dBBUs), Open-Distributed Units (O-Dus), Open-Radio Units (O-RUs), integrated baseband units (iBBUs).

The cloud platform 108 (i.e., O-cloud) is configured to support and manage the C-RAN components by hosting cloud resource pools across multiple locations. For example, the cloud platform 108 encompasses various cloud resource pools that provide necessary computational, storage, and networking resources required for deploying and managing the C-RAN components. The cloud resource pools are distributed across different geographical locations to ensure scalability, high availability, and efficient resource allocation for the C-RAN components. The cloud platform 108 is a centralized management system, providing deployment-plane and management services for the C-RAN 102. The cloud platform 108 may be, but is not limited to, Google Cloud, Amazon Web Services (AWS), and other cloud services including private cloud services. The cloud platform 108 is configured with an infrastructure management service (IMS) 118 and a deployment management service (DMS) 120.

The IMS 118 is configured to manage physical and virtual infrastructure in the cloud platform 108, including provisioning, scaling, and monitoring of the resources like servers, storage, and networking equipment. For instance, the IMS 118 provides new virtual machines (VMs) or containers in response to a request from the SMO framework 110 to deploy additional NFs. As used herein, the NFs pertain to O-RAN related functions deployed within a cloud environment, such as the radio units 114, the baseband units 116, and other management or orchestration components supporting RAN operations. The IMS 118 can allocate additional CPU cores, memory, and the storage to deployment when a user demand increases, such as scaling up the baseband units 116 during peak traffic hours. Additionally, the IMS 118 continuously monitors the health of physical servers and the networking equipment, detecting failures or performance degradation, and initiates automated corrective actions like migrating virtual instances to healthy nodes within the cloud platform 108.

The DMS 120 is configured to manage the deployment of software services, applications, and the NFs in the cloud platform 108. The DMS 120 ensures that the NFs are deployed, updated, and scaled according to demand and operational needs. For instance, the DMS 120 can receive a request from the SMO framework 110 to deploy an additional baseband unit instance within the cloud platform 108 in response to increased traffic load in a specific geographic area. In response, the DMS 120 allocates the necessary compute, storage, and network resources from the cloud resource pools, initiates the deployment of the baseband unit instance, configures the baseband unit instance with initial settings (such as internet protocol (IP) addresses and security credentials), and monitors a deployment process to ensure successful instantiation and operation.

The SMO framework 110 is configured to manage, monitor, and orchestrate a lifecycle of the C-RAN components and the NFs. The SMO framework 110 facilitates tasks such as onboarding new NFs, configuration management, performance monitoring, fault management, and resource orchestration across the C-RAN 102. The SMO framework 110 includes a Federated O-Cloud Orchestration & Management (FOCOM) component 122 and Network Function Orchestration (NFO) 124.

Figure 2A:
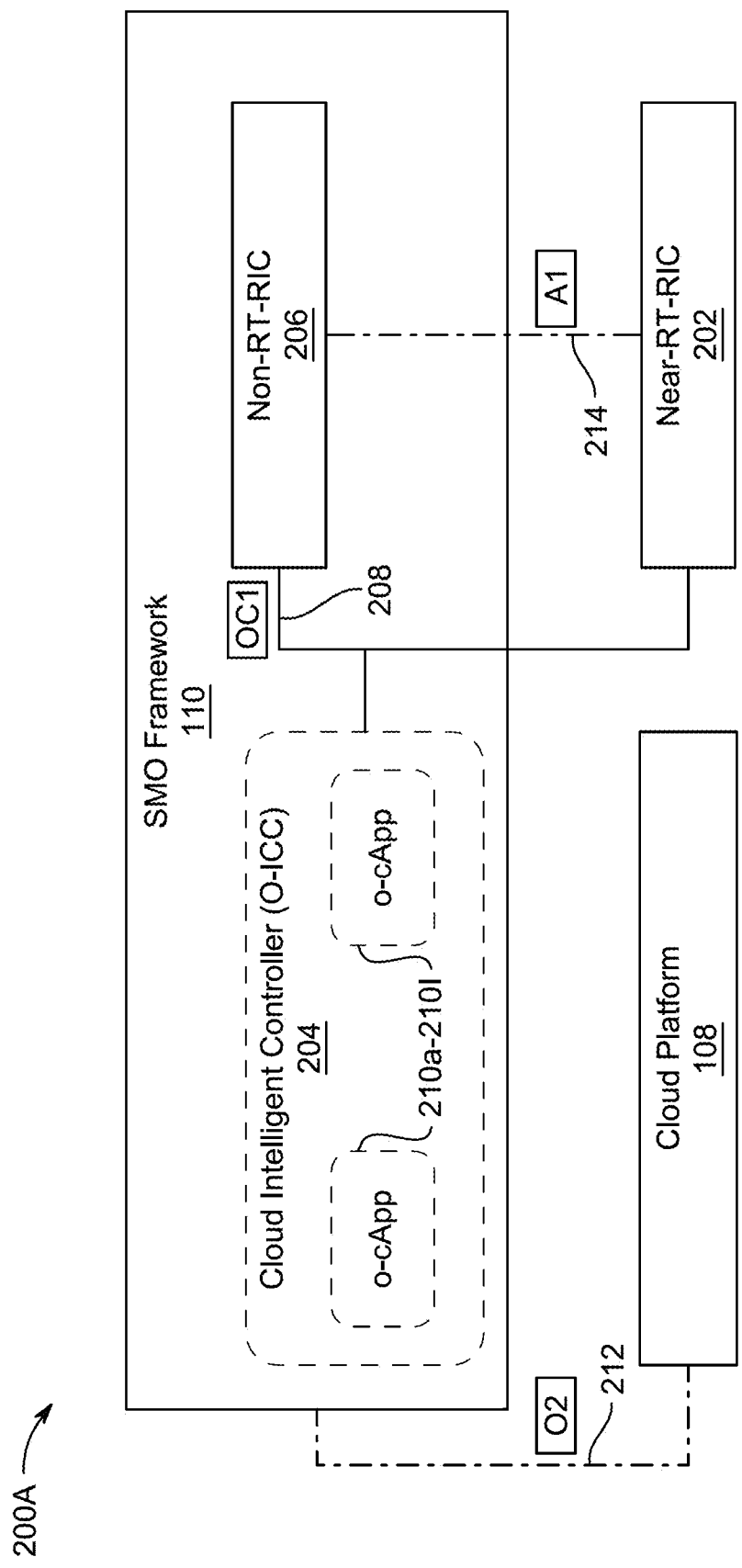
FIG. 2A illustrates an exemplary C/O/v-RAN architecture, according to certain embodiments.

The FOCOM component 122 is configured to facilitate and optimize communication between different entities within the C-RAN 102, in the context of the cloud platform 108 (i.e., O-cloud). In other words, the FOCOM component 122 manages a flow of control messages and ensures that the communication between components, such as a Open Intelligent Cloud Controller (O-ICC) 204 (as shown in FIG. 2A), a non-real-time RAN intelligent controller (Non-RT-RIC) 206 (as shown in FIG. 2), a near real time RAN intelligent controller (Near-RT-RIC) 202 (as shown in FIG. 2), and the cloud platform 108 is smooth and optimized. The FOCOM component 122 supports the O-ICC 204 in coordinating resource management and optimization tasks during the deployment, scaling, and updating processes of the cloud platform 108 and the NFs.

For instance, when a new NF is deployed or scaled in the cloud platform 108, the FOCOM component 122 ensures that the communication between the O-ICC 204 and the DMS 120 of the cloud platform 108 is executed efficiently. Additionally, the FOCOM component 122 supports optimizing cloudification processes, such as minimizing latency by managing a data flow and controlling the required resources for each deployment. In an embodiment, during updates or scaling of the NFs, the FOCOM component 122 can be configured to query a software inventory, obtain resource availability reports from the cloud platform 108, and facilitate the communication necessary for the O-ICC 204 to optimize resource usage and minimize delays. By dynamically adjusting resource allocations and managing communication protocols, the FOCOM component 122 ensures that the cloud platform 108 efficiently supports the various C-RAN components while maintaining low latency and high performance.

The NFO 124 is responsible for optimizing the deployment and operation of the NFs within the C-RAN 102. In an embodiment, the NFO 124 works closely with the O-ICC 204, the DMS 120, and other entities to ensure efficient scaling, resource allocation, and optimization of physical and virtualized NFs. In an exemplary embodiment, the NFO 124 can optimize the allocation and usage of resources in the cloud platform 108, ensuring that the NFs are deployed with minimal latency and using the least amount of resources required for optimal performance. In an exemplary embodiment, the NFO 124 ensures that the resources such as the computing power, memory, and storage are allocated efficiently across different NFs. In another exemplary embodiment, the NFO 124 can be configured to scale out or scale in the NFs based on current network demands and operational requirements. The NFO 124 can interact with the O-ICC 204 to dynamically adjust the scale of resources used by deployed NFs, optimizing performance and minimizing resource wastage. In yet another exemplary embodiment, the NFO 124 is configured to manage changes in network topology as the NFs are added or removed from the cloud platform 108. In such embodiment, the NFO 124 ensures that the changes do not negatively impact the overall performance of the C-RAN 102 and remain stable under dynamic conditions.

For example, during the scaling out of a new NF (e.g., deploying additional baseband units 116 or radio units 114 in the cloud platform 108), the SMO framework 110 can request the NFO 124 to deploy additional resources in the cloud platform 108. The NFO 124, in coordination with the DMS 120, ensures that the right amount of resources is allocated efficiently for the new NF. The NFO 124 optimizes resource usage, reducing unnecessary overhead and ensuring that latency between the C-RAN components remains minimal.

Once the resources are deployed, the NFO 124 works with the O-ICC 204 to monitor and fine-tune the deployed NF, adjusting the resource allocation to meet real-time network demands and ensuring that the NF operates at peak efficiency.

FIG. 2A illustrates an exemplary C-RAN architecture 200A, according to certain embodiments. In an embodiment, the C-RAN architecture 200A corresponds to the C-RAN 102 of FIG. 1. The C-RAN architecture 200A represents the cloud environment hosting O-RAN components such as the radio units 114, the baseband units 116 and RICs (e.g., Near-RT-RIC 202 and Non-RT-RIC 206). The C-RAN architecture 200A utilizes virtualization and cloud-native technologies to provide efficient distribution, operation, and maintenance of the NFs. This enables faster rollouts of services and centralized control with dynamic scaling.

In the present disclosure, the C-RAN architecture 200A is configured to disaggregate conventional RAN functions (e.g., radio resource management, mobility management, and handover control) and enable cloudification and orchestration through modular entities such as the O-ICC 204 and cloud Applications (o-cApps) 210a-210l. As used herein, the term "cloudification" refers to migration of the RAN functions to cloud platforms (e.g., deploying the baseband units 116 in a centralized data center such as the AWS or Google Cloud), for dynamic allocation of the resources. Also, as used herein, the term "orchestration" refers to automated management and coordination of cloud-based resources and services, such as instantiating the NFs on demand, updating software components remotely, or scaling up compute capacity based on traffic patterns.

The C-RAN architecture 200A includes the cloud platform 108, the SMO framework 110 and the near-RT-RIC 202. The SMO framework 110 includes the O-ICC 204, the non-RT-RIC 206, an open cloud interface (OC1) interface 208, and the cloud Applications (o-cApps) 210a-210l (hereinafter collectively referred to as the o-cApps 210 and individually referred to as the o-cApp 210). In an embodiment, the SMO framework 110 interacts with the cloud platform 108 through a first interface, such as O2 interface 212. In an embodiment, the O2 interface 212 enables the SMO framework 110 to interact with the cloud platform 108 for performing various management and orchestration functions, such as resource provisioning, software updates, fault monitoring, and performance optimization. The O2 interface 212 supports services including, but not limited to, resource discovery, reservation, and configuration management and employs standardized protocols such as representational state transfer application program interface (REST API) with secure communications over hypertext transfer protocol (HTTP) or hypertext transfer protocol secure (HTTPS). Additionally, the O2 interface 212 is logically split into a direct (O2d) interface for direct resource control and an infrastructure management service (O2ims) interface for mediated control via cloud infrastructure managers. In the present disclosure, the SMO framework 110 leverages the O2 interface 212 to optimize the lifecycle management of virtualized RAN functions hosted within the C-RAN architecture 200A on the cloud platform 108.

The O-ICC 204 is configured to control the operations in the cloud platform 108. The operations within the cloud platform 108 may be, but not limited to, resource allocation and scaling, NF deployment and instantiation, software updates.

The O-ICC 204 is configured to control the the IMS 118 and the DMS 120 for matching logical/hardware resources between different software entities (e.g., VMs, containers, o-cApps 210) to avoid over or under-allocation of the logical/hardware resources. In an embodiment, the logical resources may be but are not limited to, virtual CPUs (vCPUs), virtual memories (vRAM), virtual storage volumes, virtual networks, and other virtualized systems. The hardware resources may be, but not limited to, physical CPUs, physical memory, and physical storage devices.

In an exemplary embodiment, a process of controlling the IMS 118 and the DMS 120 begins when the DMS 120 sends a request to the O-ICC 204 for resource allocation, detailing specific requirements such as CPU, RAM, and storage for the software entities to be instantiated. In turn, the O-ICC 204 continuously monitors resource utilization across the entire cloud platform 108, tracking essential metrics like CPU usage, memory consumption, disk input/output (I/O), network bandwidth. Based on the metrics, the O-ICC 204 intelligently determines how much resource to allocate to the new NF, balancing the need for efficient utilization while preventing the over-allocation and under-allocation.

For example, the over-allocation is where resources are requested more than what is available, which may lead to inefficiency, underutilization of resources, and higher operational costs. If the O-ICC 204 detects potential over-allocation, the O-ICC 204 can either scale down the resource allocation or delay deployment until sufficient capacity is available. On the other hand, the under-allocation can result in performance issues such as high latency or service interruptions, particularly if the allocated resources are insufficient for the application's demand. In such cases, the O-ICC 204 requests additional resources from the IMS 118 or prompts the DMS 120 to scale the resources accordingly.

The O-ICC 204 continues to adjust the resource allocations in real time based on evolving network demands. For instance, as more users are added to the NF, the O-ICC 204 can request additional resources to maintain optimal performance. Conversely, if the demand decreases, the O-ICC 204 can scale down the resources to optimize cost-efficiency and ensure that the resources are utilized effectively without waste.

The O-ICC 204 is configured to add and remove RAN nodes 106 within a restricted loop time. In other words, the O-ICC 204 is configured to manage the lifecycle of the RAN nodes 106 in a timely and efficient manner within the cloud platform 108. This adaptability is crucial for the operators to meet changing traffic demands and deployment requirements in a dynamic environment. In an exemplary embodiment, adding the RAN nodes 106 refers to the ability of the O-ICC 204 to deploy new RAN nodes on-demand based on the network's needs, such as increased traffic or coverage expansion and removing the RAN nodes 106 refers to decommission of nodes when the RAN nodes 106 are no longer needed or if the resources need to be optimized for efficiency or cost reduction. Also, as used herein, the restricted loop time refers to a specific time frame within which the O-ICC 204 must complete a process of adding or removing the RAN nodes 106. Hence, the O-ICC 204 is configured to dynamically scale the RAN infrastructure in real time, ensuring that the resources are efficiently managed according to the traffic demands and network conditions.

In an embodiment, the O-ICC 204 is also configured to reduce operational costs by providing a more intelligently controlled C-RAN architecture 200A that supports friendly human-machine interactions. This intelligent control reduces the need for manual intervention, streamlines network operations, and helps lower maintenance and operational expenses.

The O-ICC 204 is also configured to orchestrate control for virtualized base station functionalities within the cloud platform 108. In conventional mobile networks, the base station functionalities are carried out by dedicated hardware (e.g., baseband units 116 and radio units 114). However, in the C-RAN architecture 200A, many of the base station functions are virtualized and run on cloud infrastructure such as the VMs or containers. This allows for more flexible deployment, scaling, and resource management in the cloud platform 108. The virtualized base station functionalities include radio resource management, signal processing, scheduling, interfacing with the cloud platform 108. In the C-RAN architecture 200A, the O-ICC 204 ensures that the virtualized components of the base station, whether the components are the radio units 114 or the baseband units 116, are efficiently deployed, scaled, and managed within the cloud environment. For example, as the demand increases due to a large event or increased mobile traffic in a certain area, the O-ICC 204 can dynamically scale the virtualized base station functionalities. The O-ICC 204 can allocate more VMs or containers to run additional instances of the radio units 114 and the baseband units 116 to handle the increased mobile traffic, ensuring that the C-RAN architecture 200A can handle the load efficiently. The O-ICC 204 also ensures end-to-end control and coordination between all virtualized components of the C-RAN architecture 200A, ensuring that the virtualized components work together seamlessly.

The non-RT-RIC 206 is configured for non real-time control of the RAN logical/hardware resource allocation. In an embodiment, the non-RT-RIC 206 can be configured to manage and optimize the RAN nodes 106 at a higher level by processing longer-term strategies and plans. The non-RT-RIC 206 operates on a timescale of seconds to minutes, enabling it to make strategic decisions about resource allocation, RAN optimization, and network configuration. In an embodiment, the non-RT-RIC 206 interacts with the O-ICC 204 to align non-real-time decisions with the operational goals of the cloud platform 108. In an embodiment, the non-RT-RIC 206 focuses on optimizing resource distribution across the RAN nodes 106 and improving network performance by using analytics and machine learning algorithms, while the O-ICC 204 is more focused on real-time, operational decisions such as resource instantiation and scaling.

In an exemplary embodiment, the non-RT RIC 206 interacts with the O-ICC 204 over the open cloud interface, such as the OC1 interface 208, with high-level control signals, which informs decisions about the resource allocation, traffic management, or RAN configuration. For example, the non-RT-RIC 206 can use historical data and predictive analytics to forecast high traffic loads in certain areas of a network. Based on the data, the non-RT-RIC 206 can suggest that the O-ICC 204 allocates more resources to certain RAN nodes 106 or adjusts the configuration of the antennas 112 and other RAN components in anticipation of higher demand. The O-ICC 204 then takes high-level suggestions and translates the suggestions into actionable, real-time instructions, such as dynamically allocating virtual resources, deploying new RAN functions, or modifying configurations to meet immediate demands.

In an embodiment, the near-RT-RIC 202 is deployed within the cloud platform 108, positioned close to the RAN node 106 to support near real-time (on the order of 10 milliseconds to 1 second) control and optimization of the logical and hardware resource allocations in the RAN node 106. In an exemplary embodiment, the near-RT-RIC 202 is directly responsible for managing and adjusting how radio network resources (like logical functions and hardware capacity) are allocated across the RAN within a time frame of 10 milliseconds to 1 second (which is considered near real-time in network control).

The near-RT-RIC 202 dynamically manages radio resources, balancing loads across cells, handling interference mitigation, optimizing handovers, and enhancing quality of service (QoS) parameters based on live network conditions. In an embodiment, the near-RT-RIC 202 is configured to manage these by hosting modular applications such as xApps, which implement control policies and make intelligent decisions in near-real time. For example, in a scenario where a sudden surge in user traffic occurs at a live stadium event, the near-RT-RIC 202 can rapidly reallocate bandwidth and adjust scheduling to maintain service quality. Similarly, if two neighboring cells experience interference, the near-RT-RIC 202 dynamically modify antenna tilt or frequency usage to mitigate the issue. The near-RT-RIC 202 communicates with the RAN node 106 via an interface (e.g., E2 interface) and operates as a logically centralized entity, though it can be physically distributed across multiple edge cloud locations to satisfy stringent latency requirements.

In an embodiment, the non-RT-RIC 206 and near-RT-RIC 202 interact with each other through an interface such as A1 interface 214. The A1 interface 214 facilitates communication between the non-RT-RIC 206 and near-RT-RIC 202, allowing the non-RT-RIC 206 to provide high-level, long-term optimization policies and goals, while the near-RT-RIC 202 acts on the provided policies, performing real-time adjustments. For example, if the non-RT-RIC 206 notices a shift in demand patterns over a period (e.g., due to a large event), the non-RT-RIC 206 sends updated policy decisions to the near-RT-RIC 202 to fine-tune real-time network operations. In another embodiment, the near-RT-RIC 202 can send real-time feedback to the non-RT-RIC 206 regarding the effectiveness of the implemented policies. This feedback loop ensures that any modifications to the network conditions are reflected in the long-term strategies used by the non-RT-RIC 206, allowing for iterative optimization of the network.

The OC1 interface 208 enables direct communication of messages between the O-ICC 204 and both the non-RT-RIC 206 and the near-RT-RIC 202. In an embodiment, the OC1 interface 208 provides a direct communication path that enables both the non-RT-RIC 206 and the near-RT-RIC 202 to interact with the O-ICC 204, which is responsible for orchestrating control and resource management within the cloud platform 108. In an aspect, the OC1 interface 208 acts as a bridge between a high-level strategic decision-making of the non-RT-RIC 206 and real-time operational adjustments made by the near-RT-RIC 202. This ensures that the overall RAN operation remains optimized, both in a short term and over longer periods, by providing a unified mechanism for information exchange. In an exemplary embodiment, through the OC1 interface 208, the non-RT-RIC 206 can send high-level control signals or suggestions to the O-ICC 204, which can include recommendations for adjusting the resource allocations, optimizing traffic routing, or preparing the network for anticipated load changes. The O-ICC 204, in turn, uses this information to make real-time adjustments to the cloud platform 108, ensuring that the resources are appropriately deployed and that the RAN functions optimally in response to strategic insights provided by the non-RT-RIC 206.

Consider a scenario where a major event, such as a live concert, occurs in a specific region, leading to the surge in the mobile traffic. The non-RT-RIC 206, based on the historical data and predictive analytics, forecasts the impact of the event on network demand and sends a recommendation to the O-ICC 204 via the OC1 interface 208. The recommendation can include suggesting increased resource allocation for the event area. The near-RT-RIC 202, on the other hand, continuously monitors the live traffic and detects an immediate increase in data usage. The near-RT-RIC 202 communicates with the O-ICC 204 through the OC1 interface 208 to request real-time adjustments, such as deploying additional virtual resources or modifying cell configurations. The O-ICC 204 then processes both sets of instructions from the non-RT-RIC 206 and the near-RT-RIC 202 and ensures that the necessary resources are allocated and scaled accordingly in the cloud platform 108 to handle the increased demand, optimizing a user experience.

The o-cApps 210 are cloud-native applications designed to run on the cloud platform 108. The o-cApps 210 are configured for customer/application procedures and services. In other words, the o-cApps 210 can be designed to execute customer-specific or application-specific procedures and to deliver associated services within the cloud platform 108, ensuring flexible, on-demand control, optimization, and management of the NFs and the resources. As used herein, the term "customer/application procedures" refers to workflows, tasks, operations, or functions that the customers or applications want to achieve. For example, the workflows, tasks, operations or functions include onboarding a new service, scaling the resources, monitoring the performance, upgrading the software, and optimizing latency.

For instance, during the software update process, the O-ICC 204 can utilize the o-cApp 210 to intelligently match minimum required resources (such as CPU, RAM, storage) with the available resources, which ensures that the software update process is carried out without overburdening the cloud platform 108. In another instance, during software deployment process, the O-ICC 204 needs to communicate with both the FOCOM component 122 and the cloud platform 108 to gather resource utilization reports before initiating the software deployment process. The o-cApp 210 facilitates this communication, ensuring that both the FOCOM component 122 and the cloud platform 108 are aligned and ready to provide the required resources for the deployment. This ensures that the deployment process proceeds without resource conflicts or delays, optimizing a setup of the software and ensuring that the software is appropriately provisioned within the cloud platform 108. In an embodiment, the o-cApps 210 optimize the communication and configuration between applications (like xApps) and the SMO framework 110 to ensure smooth operation and orchestration of the network.

In an embodiment, the o-cApps 210 are designed to meet individual requirements of the specific cloud platform 108 within the C-RAN architecture 200A, allowing the o-cApps 210 to be customized for particular network conditions, applications, or use cases. The o-cApps 210 can be highly flexible and developed to interact with existing cloud platforms, providing tailored solutions for resource optimization, network management, and automation. In an exemplary embodiment, the o-cApps 210 are designed to add new cloud platforms to the system 100 or remove/deactivate existing cloud platforms as necessary. For instance, if a new cloud platform is introduced into the system 100, the o-cApp 210 is designed to integrate the new cloud platform smoothly into the C-RAN architecture 200A, ensuring that the new cloud platform is configured correctly and optimized for the network's needs. Conversely, if an existing cloud platform becomes obsolete or is no longer required, the o-cApp 210 is used to safely remove or deactivate the existing cloud platform, ensuring that the network performance is not negatively affected by redundant or unsupported cloud platforms.

In an embodiment, the users (e.g., network operators or administrators) provide necessary inputs to the o-cApps 210 in the form of configuration parameters, policy settings, software upgrade requests. The user enters the inputs into a network management system or directly into an o-cApp interface. For example, a network operator requests an update to the software running on the cloud platform 108. The o-cApp 210 uses the input to check current resource availability and initiate the software update process, ensuring that the necessary resources are available before starting the software update process. Additionally, the user can define policy settings such as bandwidth limitations or user prioritization during the software update process.

In another embodiment, the NFs, such as the O-ICC 204, the FOCOM component 122, and the cloud platform 108, provides real-time operational inputs to the o-cApps 210 to enable optimization and orchestration of the network resources. For example, the FOCOM component 122 reports the availability of resources in the cloud platform 108. The o-cApp 210 receives the input and adjusts the allocation of resources based on the network's current requirements, ensuring that services continue without disruption. The O-ICC 204 sends updates regarding traffic demands or load balancing, prompting the o-cApp 210 to optimize the allocation of NFs accordingly.

Figure 2B:
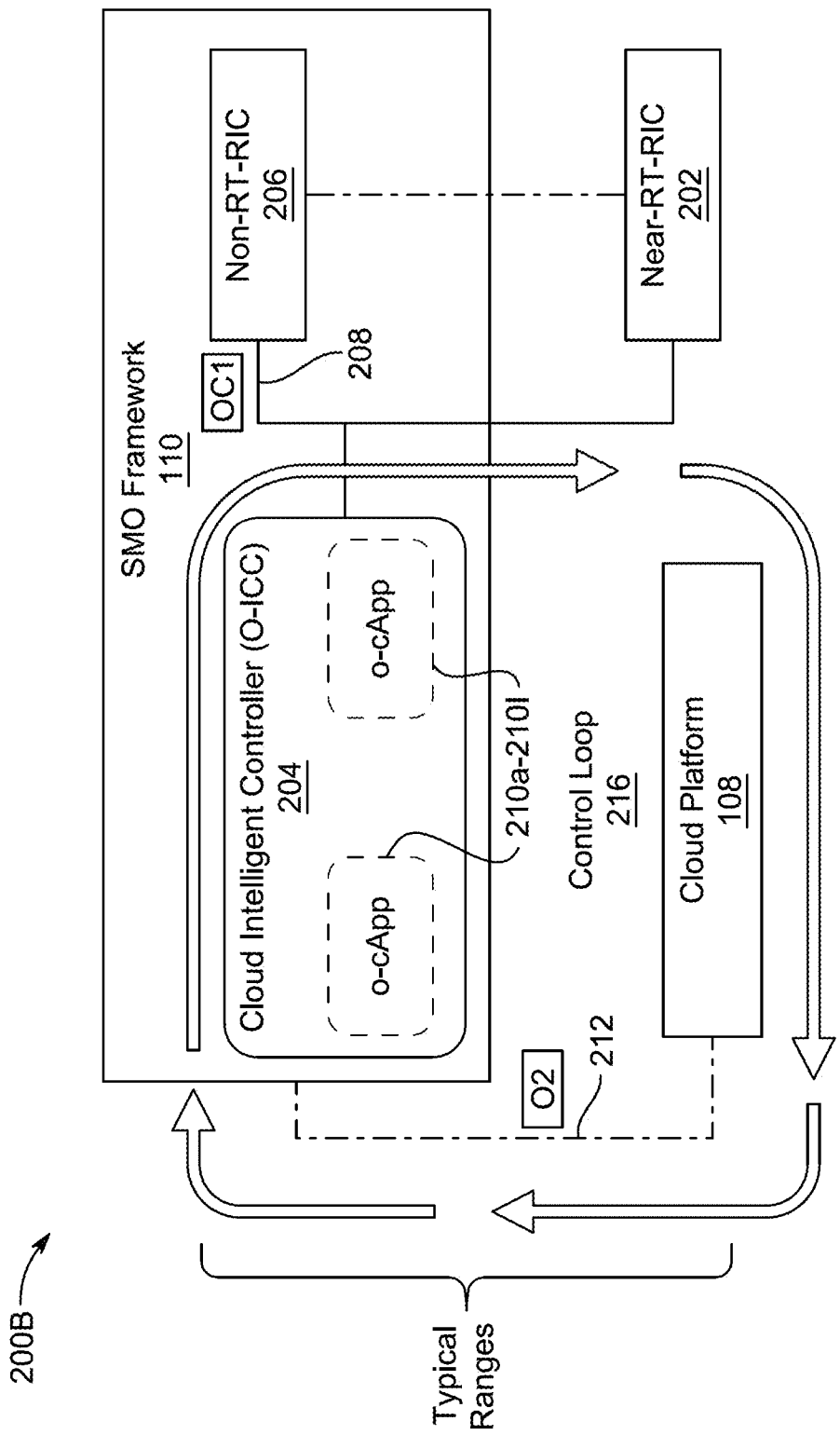
FIG. 2B illustrates an exemplary C/O/v-RAN architecture with a control loop, according to certain embodiments.

FIG. 2B illustrates an exemplary C-RAN architecture 200B with a control loop 216, according to certain embodiments. The control loop 216 is a feedback mechanism used by the O-ICC 204 to monitor a current state of the cloud platform 108 continuously, and to collect feedback, analyze real-time conditions, and dynamically adjust the resource allocation, scaling, and deployment to optimize performance and operational efficiency. The control loop 216 is often iterative, constantly making small adjustments to improve the performance over time. The control loop 216, enabled by the O-ICC 204, allows an intelligent controller to oversee the general orchestration of the network resources and dynamically optimize cloud resource allocation, scaling, and deployment based on real-time network conditions. By integrating the control loop 216 into the C-RAN architecture 200B, the system 100 enhances operational efficiency and reduces the latency through active adjustment of the logical and hardware resources according to demand, thereby improving overall performance and minimizing operational overhead. In an embodiment, the control loop 216 enables the O-ICC 204 to flexibly manage and optimize different cloud platforms by passing messages and signaling over both the O2 interface 212 and the OC1 interface 208. This setup allows dynamic out/in scaling of the o-cApps 210 based on real-time network conditions, improving resource utilization and operational efficiency.

The O-ICC 204 is configured to control the IMS 118 and the DMS 120 in order to reduce the latency of the control loop 216 of the cloud platform 108. For instance, when the network demand suddenly increases, the O-ICC 204 quickly instructs the IMS 118 to allocate additional resources and direct the DMS 120 to deploy new cloud instances. By actively monitoring the cloud platform 108 and sending control commands in real-time, the O-ICC 204 reduces the latency of the control loop 216, enabling faster-scaling actions and better handling of dynamic workloads. Moreover, the O-ICC 204 optimizes control loop operations across various scenarios, including software updates of the IMS 118, instantiation of the IMS 118 and the DMS 120, and scale-out of the NFs, thereby ensuring continuous service performance with minimal disruption.

In an exemplary embodiment, during the pre-deployment (i.e., instantiation of the IMS 118 and DMS 120), the O-ICC 204 is configured to receive a request for controlling the instantiation of the IMS 118 and DMS 120 from the non-RT-RIC 206 and/or the near-RT-RIC 202. The request includes resource requirements such as CPU, memory, and storage specifications for the deployment of the IMS 118 and DMS 120.

Once the O-ICC 204 receives the request, the O-ICC 204 acknowledges the request to the non-RT-RIC 206 and/or the near-RT-RIC 202. The non-RT-RIC 206 and/or the near-RT-RIC 202 are responsible for managing non-real-time and near-real-time functions and ensuring the synchronization between them for smooth operation within the C-RAN architecture 200B. The acknowledgment ensures that the non-RT-RIC 206 and the near-RT-RIC 202 are aware of the request and can adjust or prepare their control loops accordingly.

Following the acknowledgment, the O-ICC 204 orchestrates the instantiation of the IMS 118 through the FOCOM component 122 and the DMS 120 through the NFO 124. Once the IMS 118 and DMS 120 are instantiated, the O-ICC 204 continuously monitors resource details provided by the FOCOM component 122 and the NFO 124. The monitored resource details are used to optimize the control loop 216 of the cloud platform 108, ensuring that the allocated resources are optimized for minimizing the latency across the network.

The control loop 216 refers to a feedback system that continuously monitors and adjusts the cloud resources, ensuring that the cloud resources remain optimized for the current network conditions. The O-ICC 204 communicates through the OC1 interface 208, which allows different cloud platforms and components to interact with each other. Through the OC1 interface 208, the O-ICC 204 sends the control signals to the FOCOM component 122 and the NFO 124 to adjust the resources, allocate additional instances, or scale the cloud platform 108 in response to changing demand.

Finally, once the IMS 118 and DMS 120 are instantiated and the resources are optimized, the O-ICC 204 initiates the IMS 118 and the DMS 120 on the cloud platform 108 and confirms that both NFs are fully operational and ready for RIC services and applications.

In another exemplary embodiment, during the software updating for the IMS 118, when all the resources are reported by the FOCOM component 122 and the cloud platform 108, respectively, the O-ICC 204 is configured to perform optimization procedures using the o-cApp 210 to control the matching of the logical and hardware resources, as well as to minimize time delay within the control loop 216 of the cloud platform 108.

In yet another exemplary embodiment, during the control by the O-ICC 204, when the DMS 120 allocates the resources according to a NF deployment request, the O-ICC 204 is configured to control the allocated logical and hardware resources to minimize the latency by ensuring that the minimum required resources are used in the cloud platform 108. Once the O-ICC 204 receives reports from the cloud platform 108 and Managed Element (ME) 502, the O-ICC 204 is further configured to analyze the allocation of resources. If an initial allocation is found to be over-resourced, the O-ICC 204 requests the release of any extra logical/hardware resources. Conversely, if the allocated resources are insufficient for the deployment requirements, the O-ICC 204 requests an increase in the resources to ensure that NF deployment functions optimally. In an embodiment, a process of controlling the operations within the cloud platform 108 is explained in detail in conjunction with FIGS. 3, 4 and 5.

Figure 3:
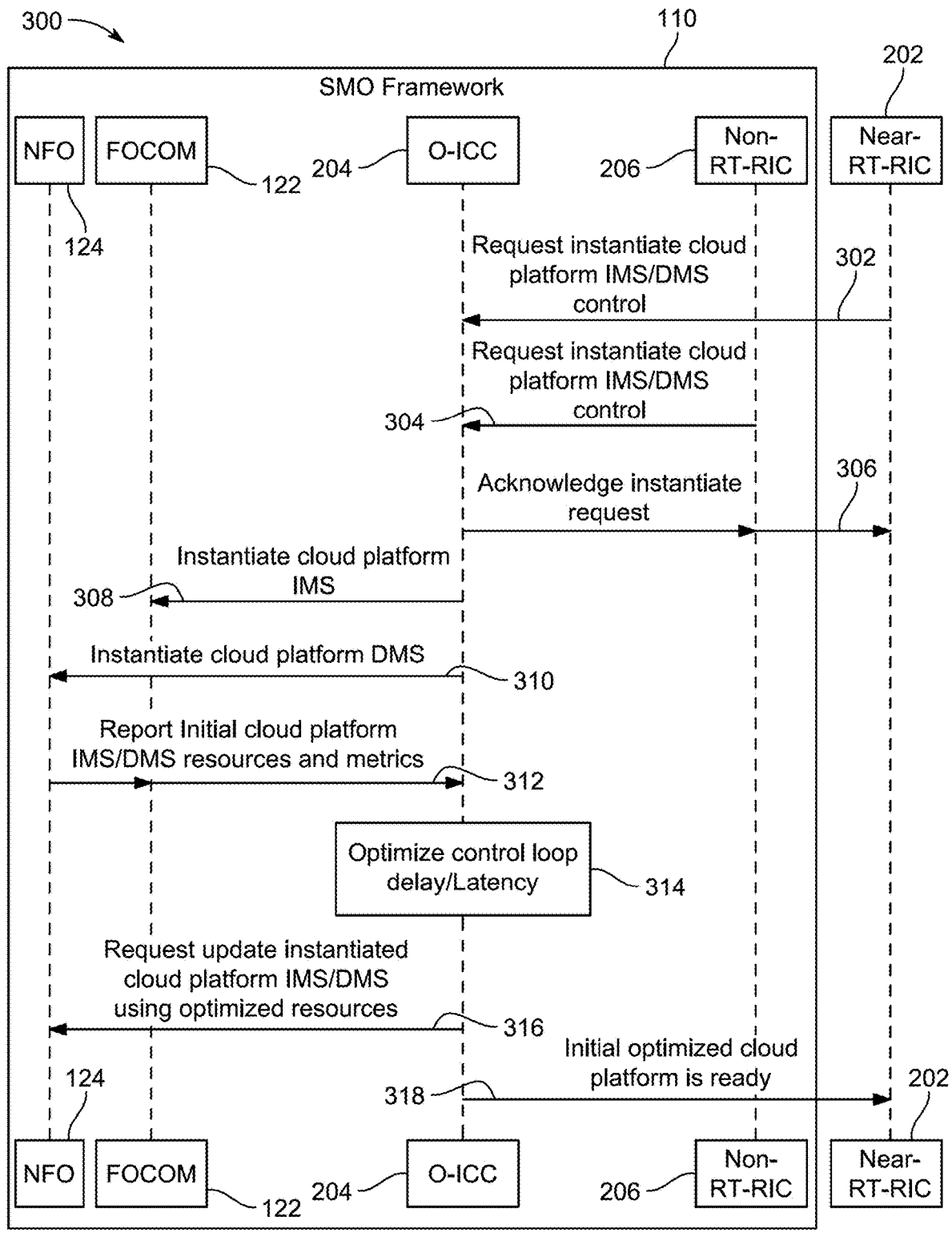
FIG. 3 illustrates an exemplary sequence diagram representing a process of controlled optimization during pre-deployment of a cloud platform, according to certain embodiments.

FIG. 3 illustrates an exemplary sequence diagram representing a process 300 of controlled optimization during pre-deployment of the cloud platform 108, according to certain embodiments.

At step 302, the process 300 includes receiving a first request by the O-ICC 204 for controlling the instantiation of infrastructure resources, such as the IMS 118 and the DMS 120 of the cloud platform 108 from the near-RT-RIC 202. In an embodiment, the O-ICC 204 receives the first request from the near-RT-RIC 202 through the OC1 interface 208. In an exemplary embodiment, the request includes details, such as, but not limited to, the type and amount of resources needed, as well as specific parameters required for instantiating the IMS 118 and DMS 120.

At step 304, the process 300 includes receiving a second request by the O-ICC 204 for controlling the instantiation of the IMS 118 and the DMS 120 of the cloud platform 108 from the non-RT-RIC 206. This step includes receiving the request by the O-ICC 204 from the non-RT-RIC 206 through the OC1 interface 208, which serves as a communication channel between the O-ICC 204 and the non-RT-RIC 206. The request includes details, such as resource requirements (e.g., details on the type and scale of resources needed for the IMS 118 and DMS 120, such as computing power, memory, storage, and networking), deployment parameters (e.g., specific configuration or deployment requirements for the IMS 118 and DMS 120 services, including which cloud infrastructure components need to be instantiated and how the components should be managed), operational context (i.e., non-RT-RIC 206 can specify the operational context or use case, such as a specific network optimization or a long-term resource allocation strategy, to help the O-ICC 204 determine a most efficient deployment plan).

This step further includes processing the first request and the second request by the O-ICC 204 to check for available capacity within the cloud platform 108, and assess whether the requested services align with existing NFs and available infrastructure. In an embodiment, this step further includes performing checks by the O-ICC 204 to ensure that the cloud platform 108 is suitable for the deployment of IMS 118 and DMS 120.

At step 306, the process 300 includes acknowledging the request by the O-ICC 204 to the non-RT-RIC 206 and/or the near-RT-RIC 202, confirming that the O-ICC 204 has received the request and is proceeding with necessary actions. In an exemplary embodiment, the acknowledgment is transmitted to the non-RT-RIC 206 and/or the near-RT-RIC 202, upon successfully processing the first request and the second request by the O-ICC 204. For example, after processing the first request and the second request by the O-ICC 204, the O-ICC 204 prepares an acknowledgment that confirms that the corresponding first request and the second request is received and the O-ICC 204 is ready to proceed with the instantiation of the IMS 118 and DMS 120. The acknowledgement serves as a signal to the non-RT-RIC 206 and/or the near-RT-RIC 202 that the O-ICC 204 proceeds with the instantiation and management of the requested infrastructure services.

At step 308, the process 300 includes instantiating the IMS 118 within the cloud platform 108 by the O-ICC 204 through interaction with the FOCOM component 122, which ensures proper orchestration and management of infrastructure resources required for the IMS 118. In an embodiment, the interaction step includes transmitting a request by the O-ICC 204 to the FOCOM component 122, specifying the infrastructure resources required for the IMS 118, such as, but not limited to, the computing power, memory, storage, networking, and so forth. For example, the O-ICC 204 can request a certain amount of CPU processing capacity, several terabytes of storage, and a specific network bandwidth allocation to ensure the IMS 118 operates effectively. Upon receiving the request by the FOCOM component 122, this step further includes evaluating, by the FOCOM component 122, available infrastructure resources within the cloud platform 108. This step involves assessing various factors such as, but not limited to, resource availability, load balancing requirements, and performance optimization. Based on the specification provided by the O-ICC 204, the FOCOM component 122 orchestrates the provisioning of the required infrastructure resources. This involves allocating virtualized resources, such as the VMs or containers, within the cloud platform 108 to support the IMS 118. For instance, the FOCOM component 122 can allocate a dedicated set of VMs for processing and a separate storage volume for the IMS 118 to ensure adequate performance and scalability.

At step 310, the process 300 includes instantiating the DMS 120 within the cloud platform 108 by the O-ICC 204 through interaction with the NFO 124, which handles the orchestration of the NFs and the deployment of necessary services within the cloud platform 108. In an exemplary embodiment, the interaction includes transmitting, by the O-ICC 204, a request to the NFO 124 for the instantiation of the DMS 120. The request specifies the NFs and the services required by the DMS 120 within the cloud platform 108. For example, the O-ICC 204 requests the deployment of specific virtual NFs (VNFs) or containers that are needed to manage the deployment of other services on the cloud platform 108. Upon receiving the request by the NFO 124, this step further includes evaluating, by the NFO 124, available resources of the cloud platform 108 to determine whether the available resources meet the requirements specified by the O-ICC 204. The evaluation step includes assessing available virtualized resources, such as computing power (e.g., the number of virtual machines or CPUs), memory, storage, and networking capacity. For instance, if the DMS 120 requires high computational capacity to manage multiple deployments simultaneously, the NFO 124 can assess whether sufficient resources are available to support a workload. Upon evaluating the available resources, this step further includes orchestrating, by the NFO 124, the provisioning of the required NFs needed for the DMS 120. This step involves setting up several VMs, containers, or software-defined network (SDN) functions that are designed to perform tasks such as deploying and managing the VNFs, network configurations, and other essential services. For example, the NFO 124 can provide a specific virtualized instance that handles load balancing for cloud services or a container that runs the orchestration and configuration management logic for the DMS 120. This step further includes deploying, by the NFO 124, the required services and NFs into the cloud platform 108.

At step 312, the process 300 includes receiving, by the O-ICC 204, reports on the allocated or deployed resources from both the FOCOM component 122 and the NFO 124. The reports include details, such as, but are not limited to, the computing power, memory, storage, and networking resources that are provisioned for the IMS 118 and the DMS 120. In an exemplary embodiment, upon instantiation of the IMS 118 and DMS 120 in the cloud platform 108, the O-ICC 204 requests the reports on the allocated resources from both the FOCOM component 122 and the NFO 124. In an aspect, the request can be triggered automatically by the O-ICC 204 after a service instantiation process. In another aspect, the request is part of a periodic resource management procedure.

For example, the O-ICC 204 can send a query to both the FOCOM component 122 and the NFO 124, asking for updates on the resources allocated for the IMS 118 and DMS 120, such as memory usage, CPU utilization, network bandwidth, and storage capacity. In an embodiment, both the FOCOM component 122 and the NFO 124 gathers, and compiles data related to the resources which are allocated or managed within the cloud platform 108. For instance, the FOCOM component 122 can generate a report on the infrastructure resources (e.g., computing power, storage) required to support the IMS 118 and the NFO 124 can generate a report on the NFs, such as VNFs, their resource allocation, and deployment in the cloud platform 108 for the DMS 120. Further, once the reports are generated, the reports can be transmitted to the O-ICC 204 through a communication mechanism, such as, but not limited to, API calls, messaging queues.

At step 314, the process 300 includes utilizing the reports by the O-ICC 204 to optimize the control loop 216 of the cloud platform 108 for minimizing the latency and delay. Optimizing the control loop 216 is a dynamic process in which the O-ICC 204 adjusts the allocation of resources based on real-time conditions, ensuring that the operations of the cloud platform 108 are running as efficiently as possible. In an exemplary embodiment, upon receiving the reports from the FOCOM component 122 and the NFO 124 that describe the actual resources allocated for the infrastructure services, the O-ICC 204 initiates an optimization cycle. The optimization cycle includes monitoring, by the O-ICC 204, real-time metrics, such as CPU load, memory usage, storage input/output (I/O) performance, network throughput, service latency, based on the reports. For example, monitoring of the real-time metrics shows that the DMS 120 is operating at 90% CPU utilization and has a latency of 250 milliseconds (ms). The optimization cycle further includes comparing a current operational condition of the cloud platform 108 to pre-defined performance goals (setpoints), like maintaining CPU usage below 70% and latency below 100 ms. Since the latency (250 ms) of the DMS 120 exceeds a target latency (100 ms), the O-ICC 204 identifies this as a deviation that needs corrective action. The optimization cycle further includes determining, by the O-ICC 204, control actions to bring the cloud platform 108 and the deployed services (IMS 118/DMS 120) back toward the desired operational state. This involves adjusting the resource allocations, scaling services up or down, optimizing network paths, or rebalancing loads across available infrastructure. Once the control actions are determined, the O-ICC 204 implements adjustments to optimize the performance of the cloud platform 108. For example, the O-ICC 204 can decide to increase the computing power for the corresponding infrastructure service, allocate more memory, or shift traffic to a less-congested network slice. These adjustments are implemented in real time to improve service performance. After the adjustments are made, the cloud platform 108 is continuously monitored again by the O-ICC 204. The cycle repeats as the cloud platform 108 seeks to optimize itself further, adjusting in response to changing conditions (e.g., new traffic spikes or resource demands). The process 300 of monitoring, adjusting, and refining is continuous, ensuring that the control loop 216 remains responsive to evolving conditions.

At step 316, the process 300 includes transmitting, by the O-ICC 204, a request 204 to the FOCOM component 122 and the NFO 124 for updating the instantiated IMS 118/DMS 120 of the cloud platform 108 using the optimized resources. In an embodiment, the O-ICC 204 sends optimization instructions to the NFO 124 and the FOCOM component 122, which are responsible for managing and orchestrating the resources for the IMS 118 and the DMS 120. For example, if the O-ICC 204 determines that the IMS 118 requires additional CPU and memory resources to achieve the target latency, the O-ICC 204 sends a request to the FOCOM component 122 specifying the optimized resource requirements. Similarly, if the DMS 120 needs to be relocated to a less congested node or requires enhanced network throughput, the O-ICC 204 sends the request to the NFO 124 to update the deployment accordingly. The NFO 124 and FOCOM component 122, upon receiving these requests, perform the necessary adjustments, such as scaling resources, reallocating workloads, or updating network configurations. After completing the updates, the NFO 124 and the FOCOM component 122 send confirmation reports back to the O-ICC 204, indicating that the IMS 118 and DMS 120 are now operating with optimized resource settings. This ensures that the control loop 216 of the cloud platform 108 remains agile, efficient, and capable of minimizing latency and delay within the cloud platform 108.

At step 318, the process 300 concludes with the O-ICC 204 initializing the optimized cloud platform 108. Once the resources are updated and the control loop 216 of the cloud platform 108 is adjusted to minimize the latency and the delay, the O-ICC 204 performs a final verification to ensure that all services (such as IMS 118 and DMS 120) are operating within desired performance thresholds. This may include checking updated metrics like CPU utilization, memory usage, and network latency to confirm that previous optimizations have had the intended effect. For example, after additional CPU cores are allocated to the IMS 118, the O-ICC 204 verifies that the latency is dropped below the target 100 ms. Similarly, if the DMS 120 was migrated to a node with higher bandwidth, the O-ICC 204 checks that data synchronization delays are reduced accordingly.

Once the verifications are completed, the O-ICC 204 sends confirmation messages to both the near-RT-RIC 202 and the non-RT-RIC 206, indicating that the cloud platform 108 is fully operational. These confirmation messages signal that the cloud platform 108 is now ready to host and support the RIC services and applications, such as xApps and rApps, which require low-latency, high-availability infrastructure. For instance, the near-RT-RIC 202 can then start deploying the xApps for dynamic load balancing or handover management, while the non-RT-RIC 206 can initiate the rApps for longer-term network optimization tasks, all relying on the optimized cloud resources.

Figure 4:
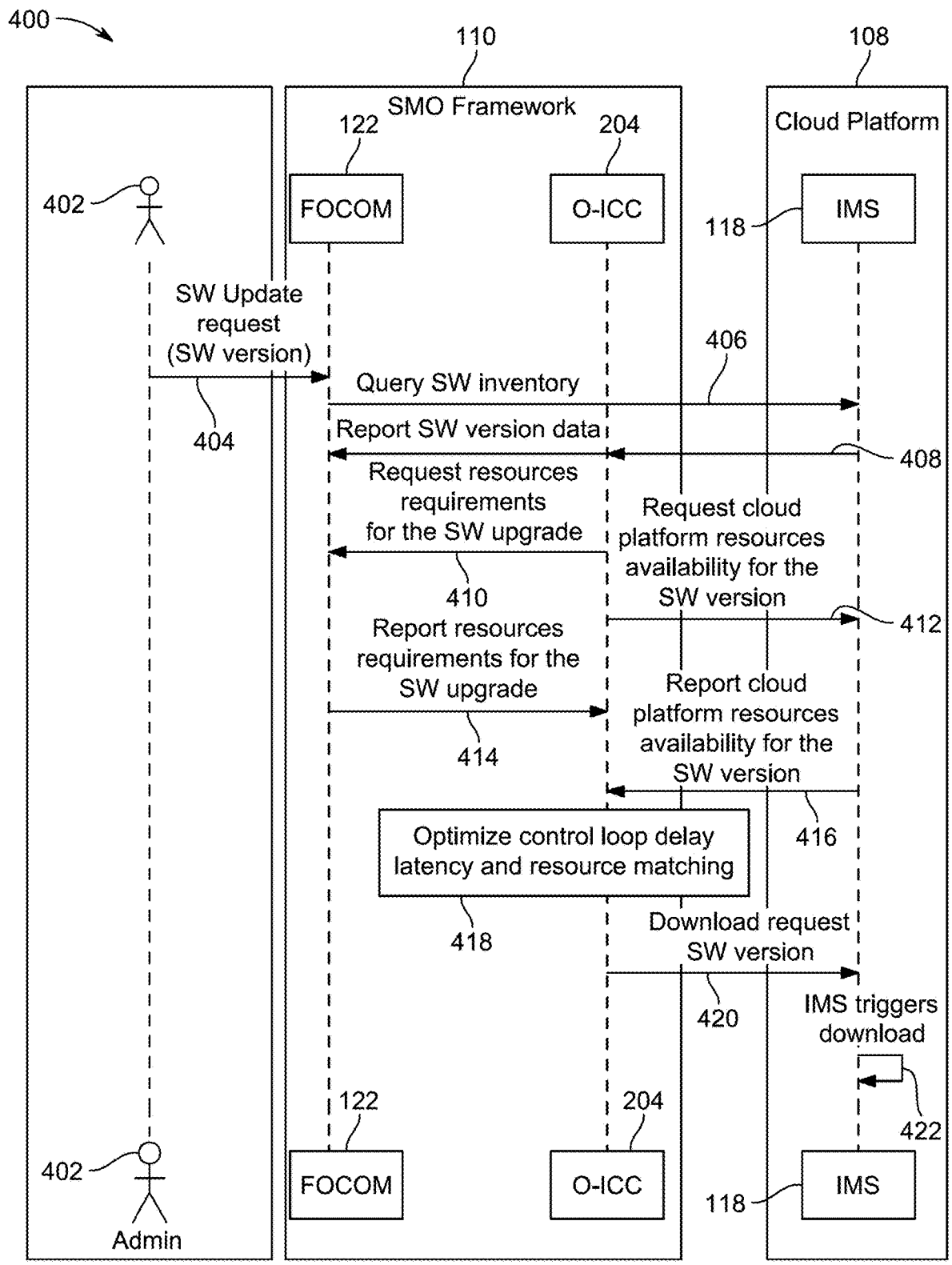
FIG. 4 illustrates an exemplary sequence diagram representing a process of controlled optimization during software updates for infrastructure management service (IMS), according to certain embodiments.

FIG. 4 illustrates an exemplary sequence diagram representing a process 400 of controlled optimization during software updates for the IMS 118, according to certain embodiments.

At step 404, the process 400 includes initiating a request for a software update procedure by an operator 402. The request is sent to the FOCOM component 122, signaling the commencement of the software update procedure. The operator 402 initiates the request by selecting a new software version to be installed through a user interface (UI) or a command-line interface (CLI), which are provided as management tools for interacting with the C-RAN architecture 200A or 200B. Once the request is received by the FOCOM component 122, the FOCOM component 122 is configured to verify a current software version running on the cloud platform 108 and determine whether the software update for the IMS 118 is necessary. For instance, an operator X can log into a network management interface, select a "Software Update" option, and enter a version number of the software to be updated. The operator X then clicks "Initiate Update", signaling the FOCOM component 122 to begin the software update procedure.

At step 406, the process 400 includes querying a software inventory by the FOCOM component 122 to the cloud platform 108 to retrieve information on the current software version installed within the cloud platform 108. In an exemplary embodiment, the FOCOM component 122 sends a request to a software management database or an inventory system of the cloud platform 108, requesting details about the current software version, such as version numbers, build information, and any relevant configurations. In an aspect, the request is formatted according to a specific API or a query language that is compatible with the cloud platform 108, ensuring that a response provides accurate and up-to-date software details. For instance, when the operator 402 requests the software update for the IMS 118, the FOCOM component 122 sends the query; for example, query: SELECT software_version FROM inventory WHERE platform='O-Cloud'. This query can return the response containing the current software version, such as "v2.2.1". The FOCOM component 122 then compares the current software version with the requested software version (e.g., "v2.3.4") to ensure compatibility and check if the software update is necessary.

At step 408, the process 400 includes receiving reports by the O-ICC 204 and the FOCOM component 122 from the cloud platform 108. The reports include detailed information about the current software version running on the cloud platform 108, along with associated metadata such as patch levels, installed modules, and configuration settings. In an exemplary embodiment, the cloud platform 108 responds to the earlier software inventory query (initiated in step 406) by compiling the requested software information into a structured report. The report is transmitted back over the secure API or a messaging interface designed for management communications within the C-RAN architecture 200A or 200B. For example, upon receiving the request, the software inventory of the cloud platform 108 processes the request, retrieves relevant records from its internal database, formats the records into a response payload (e.g., JavaScript object notation (JSON), extensive markup language (XML)), and sends the response back to requesting components (FOCOM component 122 and O-ICC 204). The FOCOM component 122 listens for the response through its established communication session, while the O-ICC 204 gets the response directly or through a notification mechanism linked to the FOCOM component 122.

At step 410, the process 400 includes transmitting a request by the O-ICC 204 to the FOCOM component 122 for obtaining resources requirements that are necessary to download and install the requested software version. In an exemplary embodiment, upon receiving the software inventory reports in step 408, this step includes sending, by the O-ICC 204, a formal request to the FOCOM component 122 to provide details about specific resource requirements needed to execute the software update procedure successfully. The resource requirements include information such as a minimum number of CPU cores, memory, storage space, operating system prerequisites, network bandwidth needed for downloading and installing a new software package. In an exemplary embodiment, the O-ICC 204 communicates with the FOCOM component 122 through standardized management interfaces (such as REST APIs or O-RAN management protocols).

For example, upon determining that an IMS software update to version 3.2.1 is intended, the O-ICC 204 sends the request to the FOCOM component 122, stating, "Please provide the resources requirements for installing IMS version 3.2.1." The O-ICC 204 thereby prompts the FOCOM component 122 to check and respond with the resource requirements. This proactive request ensures that the O-ICC 204 can plan and optimize the cloud platform 108 in advance, minimizing delays or failures during the actual software update procedure.

At step 412, the process 400 includes requesting, by the O-ICC 204, resource availability details for the software version from the cloud platform 108. In other words, the O-ICC 204 sends a request to relevant components of the cloud platform 108 to gather information about currently available resources. The resources include metrics such as available CPU cores, free RAM capacity, available storage space, and installed operating system (OS) packages. In an embodiment, the information is essential because the O-ICC 204 needs to verify whether the cloud platform 108 has sufficient resources to successfully download, install, and operate the new software version without causing system overloads or service disruptions.

For example, after requesting the resource requirements from the FOCOM component 122 for the IMS software update (step 410), the O-ICC 204 concurrently sends a resource query to the cloud platform 108 asking for details like "currently available CPU cores," "free memory size," "disk space availability," and "supported OS versions."

At step 414, the process 400 includes receiving, by the O-ICC 204, one or more reports from the FOCOM component 122 that specify the resource requirements necessary for performing the software upgrade. In an exemplary embodiment, after the O-ICC 204 sends the request for the resource requirements at step 410, the FOCOM component 122 gathers information associated with the resource requirements and compiles the information into structured reports. These reports are transmitted to the O-ICC 204 over a secured and reliable communication channel.

At step 416, the process 400 includes receiving, by the O-ICC 204, one or more reports from the cloud platform 108 that specify the available resources. In an exemplary embodiment, after the O-ICC 204 sends the request for the resource availability details at step 412, each participating cloud platform 108 gathers real-time data about its operational status and available resources. The data is then compiled into structured reports and transmitted to the O-ICC 204 over a secure management interface or API connection.

For example, the cloud platform 108 sends a report indicating that it currently has 6 free vCPUs, 16 GB of available RAM, 100 GB of free disk space, and is running Ubuntu 20.04. Upon receiving the report, the O-ICC 204 processes and organizes the data provided in the report, correlating the data with previously received resource requirement reports from the FOCOM component 122 (step 414), to evaluate whether the existing cloud platform 108 is capable of supporting the new software update without risking service disruption or performance degradation.

At step 418, the process 400 includes performing optimization procedures, by the O-ICC 204, after receiving the reports from both the FOCOM component 122 (containing the resource requirements for the new software version) and from the cloud platform 108 (containing the available resources). The O-ICC 204 utilizes the data to optimize the control loop 216 of the cloud platform 108. In an embodiment, the O-ICC 204 invokes the o-cApps 210, which are designed to optimize both resource allocation and installation timing within the cloud platform 108.

The optimization procedure includes matching available hardware and logical resources with the minimum resource requirements needed for the successful download, installation, and operation of the new software update. For example, if the report received from the FOCOM component 122 indicates that the new software version requires at least 4 CPU cores, 8 GB of RAM, and 50 GB of storage, and the report received from the cloud platform 108 shows 6 CPU cores, 16 GB of RAM, and 100 GB of storage are available, the O-ICC 204 matches and reserves only the necessary resources, ensuring efficient use of the infrastructure without over-allocating. Additionally, the optimization procedure includes performing optimization related to time delay control by adjusting the timing of operations within the cloud control loop 216 to ensure that the software update process does not introduce excessive latency or operational delays. For instance, if certain critical SMO operations are sensitive to timing, the O-ICC 204 schedules update activities in a way that minimizes impact, possibly by optimizing a sequence of installation tasks, prioritizing certain resource adjustments, or scheduling during maintenance windows.

Thus, the O-ICC 204 ensures the allocating of logical and hardware resources efficiently and maintains low latency and stable operations during and after the software update procedure.

At step 420, the process 400 includes transmitting, by the O-ICC 204, a download request for the new software version to the cloud platform 108. In an exemplary embodiment, upon optimizing the resource allocation and confirming that the necessary resources are available, the O-ICC 204 sends the download request to the cloud platform 108 to initiate the software download and installation process. The request includes the specific software version, any associated dependencies, and metadata that the cloud platform 108 requires to perform the downloading of the new software version.

For example, once the O-ICC 204 determines that the cloud platform 108 has the necessary resources (e.g., 4 CPU cores, 8 GB of RAM, and 50 GB of storage) available, the O-ICC 204 sends a request to the cloud platform 108 containing a software version ID (e.g., "SW_Version_3.2.1") along with a timestamp for scheduling. The request can also specify target nodes, the VMs, or containers where the software should be installed. In an aspect, the O-ICC 204 includes details about required bandwidth allocation or priority levels for the download process, ensuring that network traffic is optimized and does not interfere with other critical operations. For example, the O-ICC 204 can request the cloud platform 108 to allocate a high-priority network route for the download, minimizing the impact of the download on other services operating on the cloud platform 108.

At step 422, the process 400 includes triggering, by the IMS 118, the software download after receiving the download request from the O-ICC 204. Once the O-ICC 204 successfully transmits the download request, the IMS 118 initiates the software download process. The IMS 118 is a mediator between the O-ICC 204 and the cloud platform 108, ensuring that the requested software is retrieved and installed efficiently. This step involves the IMS 118 sending a command to the cloud platform 108 to start downloading the specified software package.

For example, the O-ICC 204 can send the download request for Software Version 3.2.1 to the IMS 118, along with the target VM or node in the cloud platform 108. The IMS 118 then triggers the cloud platform 108 to begin the download process for the specific software version. During the download process, the IMS 118 monitors the progress of the new software download, verify data integrity, and report a status back to the O-ICC 204.

Figure 5:
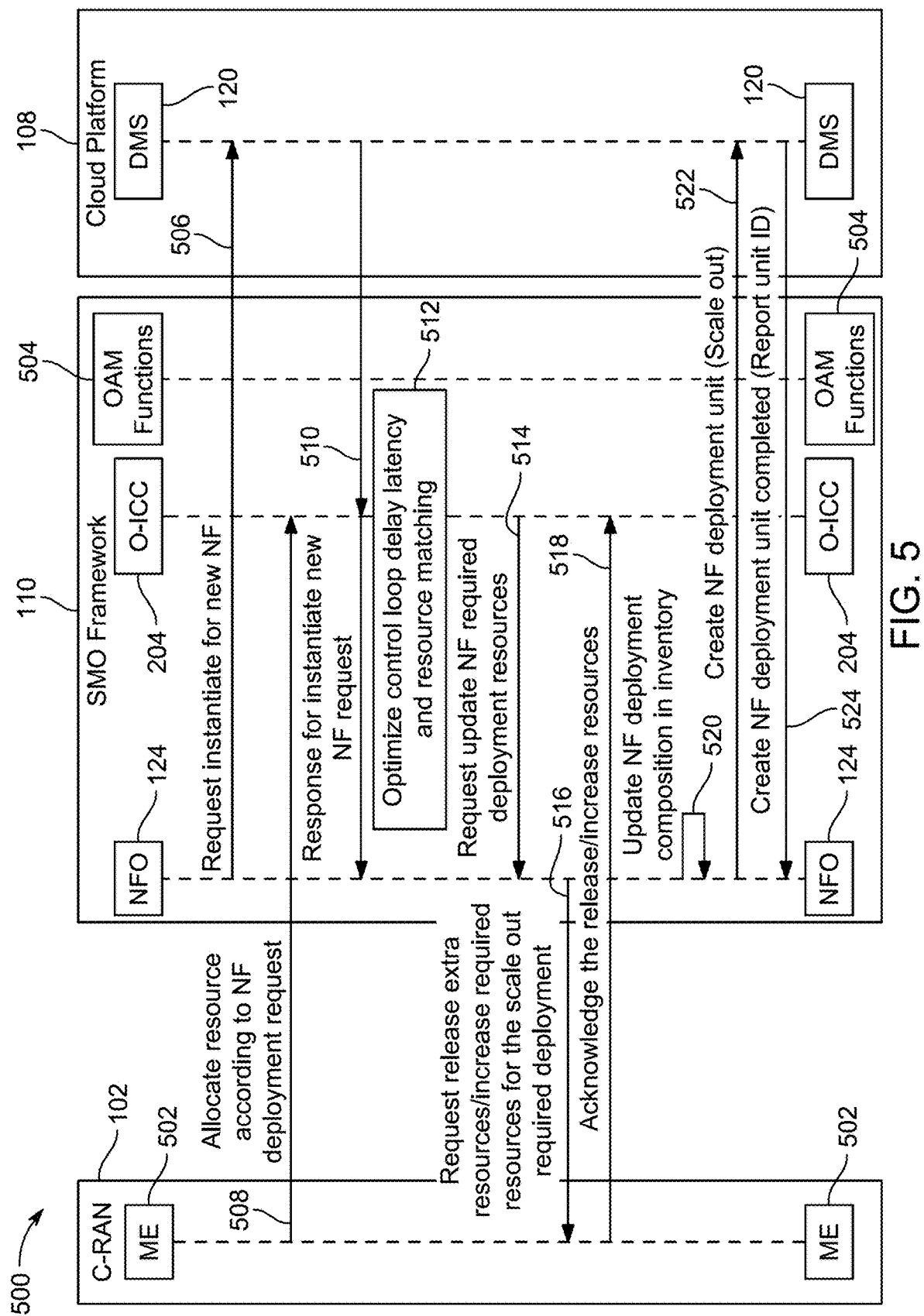
FIG. 5 illustrates an exemplary sequence diagram representing a process of controlled scaling and optimization of network functions (NFs) in the cloud platform, according to certain embodiments.

FIG. 5 illustrates an exemplary sequence diagram representing a process 500 of controlled scaling and optimization of the NFs in the cloud platform 108, according to certain embodiments.

At step 506, the process 500 includes transmitting an NF deployment request by the NFO 124 to the DMS 120 in the cloud platform 108. The NF deployment request triggers an instantiation of the NF within the cloud platform 108 using the O2dms interface, which is a standardized interface defined by the O-RAN Alliance for interactions between orchestration components and a deployment management system.

In an exemplary embodiment, the SMO framework 110 initiates the NF deployment by sending the NF deployment request to the DMS 120, instructing the DMS 120 to create a new NF deployment on a particular cloud instance. The NF deployment request includes essential parameters such as an NF type, resource profiles (e.g., required CPU cores, RAM size, storage capacity), and location constraints, if applicable.

For example, the NFO 124 determines that increased user traffic in a specific region requires scaling out the radio unit 114. In this case, the NFO 124 sends the NF deployment request through the SMO framework 110 to the DMS 120, specifying that a new radio unit instance needs to be created in a cloud cluster located in a corresponding region, requesting, for example, 8 vCPUs, 32 GB of RAM, and 500 GB of storage space.

At step 508, the process 500 includes allocating resources by the ME 502 of the C-RAN 102 to fulfill the NF deployment request, as coordinated with the O-ICC 204. In an exemplary embodiment, upon receiving the NF deployment request from the NFO 124 through the DMS 120, the DMS 120 processes the NF deployment request and identifies the need to allocate the resources based on the requested specifications and communicates with the ME 502 within the cloud platform 108 to provision the necessary resources in the cloud platform 108. Once the resources are successfully allocated by the DMS 120 in the cloud platform 108, the instantiation process of the NF begins itself. At this point, Operations, Administration, and Maintenance (OAM) functions 504 inject SMO's connectivity configurations (such as O1 interface address and security key) into the newly instantiated NF to ensure secure communication with the SMO framework 110 once the NF is fully instantiated and operational.

In an embodiment, the ME 502, which is responsible for managing and controlling virtualized infrastructure components (such as computing, storage, and networking resources), evaluates the available capacity in the cloud environment. Based on the deployment request's specifications, the ME 502 reserves and allocates an appropriate set of resources for the new NF instance.

At this point, the O-ICC 204 is informed about the allocated resources. The O-ICC 204 starts monitoring and managing the resource allocation to ensure the resource allocation aligns with the optimization goals, such as minimizing latency or preventing resource over-provisioning.

For example, if the NF deployment request specifies a requirement for 4 vCPUs, 16 GB RAM, and 200 GB of storage for the new NF instance, the ME 502 identifies suitable compute nodes within the cloud platform 108 that can meet these specifications. The ME 502 then locks these resources and updates the O-ICC 204 with reservation details to proceed with next steps of deployment and optimization.

At step 510, the process 500 includes sending, by the cloud platform 108, a response to the O-ICC 204 and the NFO 124 regarding the instantiation of the new NF. In an exemplary embodiment, after receiving the NF deployment request, the cloud platform 108 (through the ME 502) attempts to allocate the necessary resources based on the requirements provided in the NF deployment request. Once the resource allocation is successfully performed, the cloud platform 108 generates a response message. The response message includes confirmation that the resource allocation is completed, an assigned NF instance ID, a list of allocated resources, and so forth. The cloud platform 108 sends the response message to the O-ICC 204, which needs the information to optimize the deployment further, and to the NFO 124, which updates its internal inventory and tracks a deployment lifecycle.

For example, the NFO 124 sends the request to deploy the NF, requiring 4 vCPUs, 16 GB RAM, and 100 GB Storage. After evaluating the available resources, the cloud platform 108 reserves the compute node and allocate the requested resources. Then, the cloud platform 108 sends a response stating, "Deployment initiated successfully, NF Instance ID: 00123, Resources allocated: 4 vCPUs, 16 GB RAM, 100 GB storage on Node XYZ123, Deployment status: Instantiation in Progress". Once the response is delivered, the O-ICC 204 receives detailed reports from both the DMS 120 and the ME 502, including the assigned NF instance ID, resource usage details, and any performance metrics necessary for further optimization.

At step 512, the process 500 includes optimizing control loop delay latency and resource matching by the O-ICC 204. In an exemplary embodiment, once the O-ICC 204 receives the reports from both the DMS 120 and the ME 502, the O-ICC 204 begins optimizing the resource allocation for the newly instantiated NF. The O-ICC 204 evaluates a current resource allocation and identifies whether the allocated resources meet NF's actual performance requirements. If the resources are over-allocated, the O-ICC 204 reduces the allocation to avoid over-provisioning, which leads to unnecessary resource wastage. On the other hand, if the allocated resources are insufficient for NF's operational needs, the O-ICC 204 requests additional resources. This process helps minimize the latency by ensuring that only the required resources are utilized. For instance, if the NF instance has been allocated 8 vCPUs but only requires 4 vCPUs for optimal operation, the O-ICC 204 adjusts the allocation to 4 vCPUs, ensuring efficiency.

At step 514, the process 500 includes sending, by the O-ICC 204, an updated resource request to the NFO 124 to update NF's deployment resources upon optimization of the resource allocation. In an embodiment, the updated resource request specifies whether the resources need to be increased or decreased based on the optimization of the resource allocation. The NFO 124 receives updated resource specifications from the O-ICC 204. The updated resource request aims to ensure that the NF operates within optimal resource boundaries established by the O-ICC 204, avoiding over-provisioning and under-provisioning. For example, after the O-ICC 204 determines that the allocated 8 vCPUs are unnecessary for the NF instance, the O-ICC 204 requests the NFO 124 to reduce the allocation to 4 vCPUs and 16 GB of RAM.

At step 516, the process 500 includes sending, by the NFO 124, a resource adjustment request to release extra logical/hardware resources or increase logical/hardware resources for scaling out required deployment to the ME 502. In an exemplary embodiment, after the NFO 124 receives the updated resource request from the O-ICC 204, the NFO 124 communicates with the ME 502 to either release excess resources or request additional resources for scale-out as needed. If the initial allocation is over-resourced, the NFO 124 instructs the ME 502 to release surplus resources to optimize the resource usage. For instance, if the initial allocation included 8 vCPUs but only 4 are required, the NFO 124 will request the ME 502 to release extra 4 vCPUs and 16 GB of RAM. Conversely, suppose the allocated logical/hardware resources are below a level of required logical/hardware resources. In that case, the NFO 124 sends a request to the ME 502 to allocate additional resources, such as adding 4 more vCPUs and 8 GB of RAM for the NF instance.

At step 518, the process 500 includes acknowledging, by the ME 502, the release or increase of the resources to the O-ICC 204. In an exemplary embodiment, upon receiving the resource adjustment request from the NFO 124, the ME 502 processes the resource adjustment request and proceeds to either release the extra resources or allocate the additional resources as necessary. Once the resource adjustment is completed, the ME 502 sends an acknowledgment to the O-ICC 204, confirming a successful release or allocation of the requested resources. In the case of releasing resources, the ME 502 provides the O-ICC 204 with details about the released resources, such as the number of vCPUs or the amount of memory that is de-allocated. If the resource adjustment request involves increasing the resources, the ME 502 confirms new allocations, specifying additional resources provided, such as additional storage capacity or processing power. This step ensures that the O-ICC 204 is kept informed about a status of the resource changes and takes necessary actions for further optimization or monitoring.

At step 520, the process 500 includes updating an NF deployment composition in a corresponding inventory by the NFO 124, after receiving the acknowledgment from the ME 502 regarding the resource adjustment. In an embodiment, updating the NF deployment composition includes details about the resources allocated to the NF, such as the number of vCPUs, the amount of RAM, storage space, and any changes made during the optimization process. The updated inventory record ensures that the NFO 124 maintains an up-to-date log of all the NF resources, which is critical for operational monitoring, capacity planning, and troubleshooting.

For example, if the NFO 124 initially deployed the NF instance with 8 vCPUs, 32 GB of RAM, and 500 GB of storage, but after the optimization, the configuration changes to 4 vCPUs and 16 GB of RAM, the NFO 124 updates its inventory to reflect this new resource configuration. In an embodiment, after the NFO 124 updates the inventory, the OAM functions 504 validates and maintains system-wide consistency of an NF deployment state and associated resource configurations.

At step 522, the process 500 includes initiating, by the NFO 124, a creation of a new NF deployment (scale-out) on the cloud platform 108. In an exemplary embodiment, after the resource allocation process is completed and acknowledged, and any necessary adjustments are made to the existing resources, the NFO 124 proceeds to request the cloud platform 108 to instantiate additional resources as part of a scaling-out process. The NFO 124 sends the deployment request to the cloud platform 108, specifying the new instance's required resources and configuration parameters.

In this scenario, the cloud platform 108 begins processing the NF deployment creation by allocating additional virtualized resources according to the specified configurations. The deployment request triggers the cloud platform's orchestration and resource management components, which interact with cloud's underlying infrastructure and service management layers to set up the required resources.

At step 524, the process 500 includes providing, by the cloud platform 108, a newly created unit identifier (ID) to the NFO 124 and the O-ICC 204 after the NF deployment (scale-out) is completed. Once the cloud platform 108 processes the scale-out deployment and successfully creates the new NF instance, it generates a unique deployment unit identifier (Unit ID) for the newly instantiated resource. The Unit ID is a key reference that uniquely identifies the specific deployment within the cloud platform 108.

The cloud platform 108 then communicates the Unit ID to both the NFO 124 and the O-ICC 204. This allows both the NFO 124 and O-ICC 204 to track, monitor, and manage the new NF instance, and to continue their orchestration, management, and optimization tasks. The NFO 124 uses the Unit ID to update its internal inventory and ensure that the new NF deployment is registered and monitored as part of the overall system 100. Similarly, the O-ICC 204 uses the Unit ID to align the new resources with existing configurations and optimization goals, ensuring that the resources are utilized efficiently and that latency or resource allocation issues are minimized.

Figure 6:
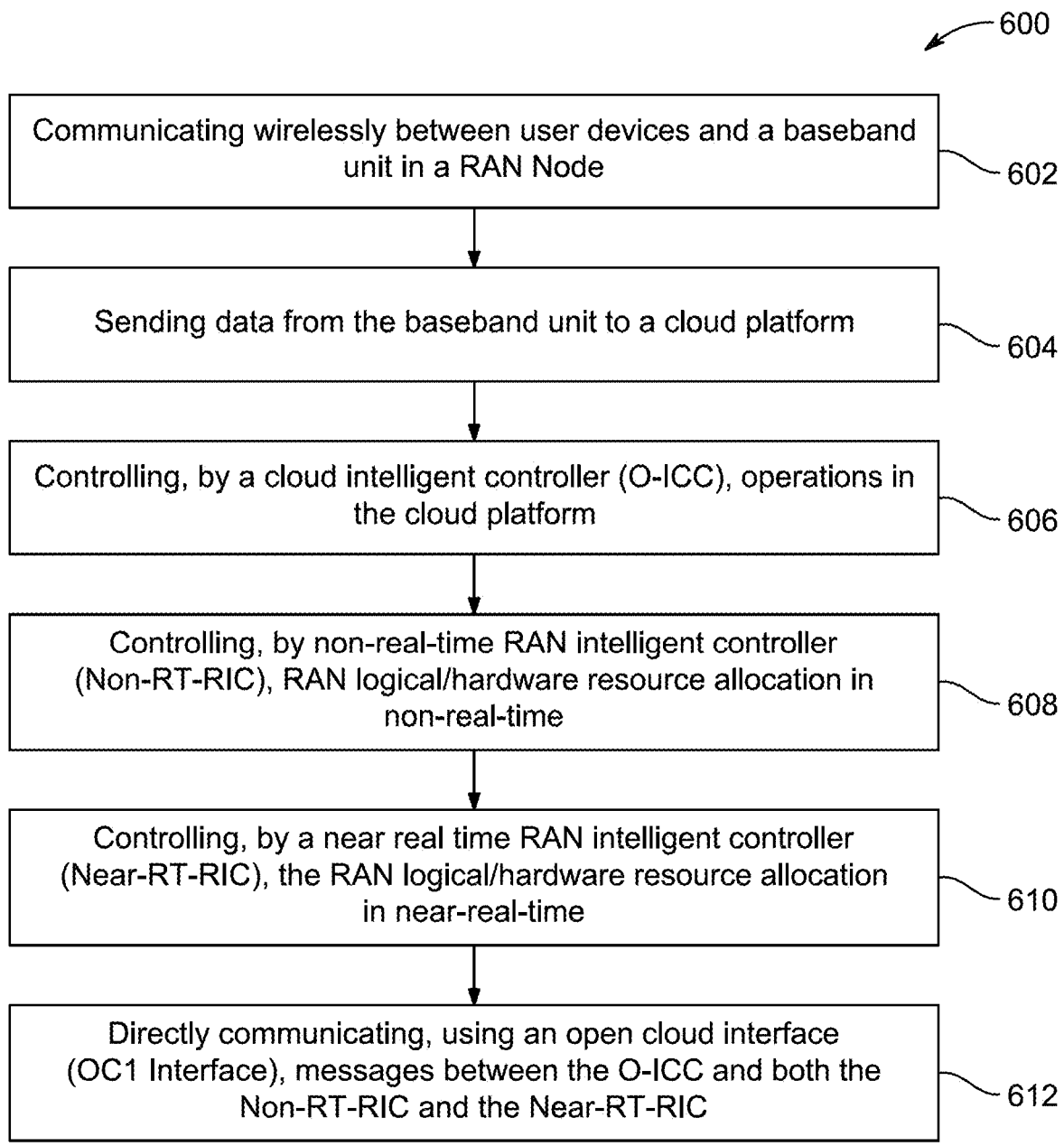
FIG. 6 illustrates a flowchart of a method for minimizing the communication latency in the C/O/v-RAN, according to certain embodiments.

FIG. 6 illustrates a flowchart of a method 600 for minimizing the communication latency in the C-RAN 102, according to certain embodiments. The method 600 includes a series of steps. These steps are only illustrative, and other alternatives may be considered where one or more steps are added, one or more steps are removed, or one or more steps are provided in a different sequence without departing from the scope of the present disclosure.

At step 602, the method 600 includes communicating wirelessly between the user devices 104 and the baseband unit 116 in the RAN Node 106. In an embodiment, the user devices 104 communicates with the baseband unit 116 through the antennas 112 that receives the data transmissions from the user devices 104 in the form of the signal through the wireless communication technologies, and transmits the data in the digital form to the baseband unit 116.

At step 604, the method 600 includes sending the data from the baseband unit 116 to the cloud platform 108.

At step 606, the method 600 includes controlling, by the O-ICC 204, the operations in the cloud platform 108. This step includes controlling, by the O-ICC 204, the IMS 118 and the DMS 120 in order to reduce the latency of the control loop 216 in controlling the cloud platform 108. This step further includes controlling, by the O-ICC 204, the IMS 118 and the DMS 120 for matching the logical/hardware resources between the different software entities of the cloud platform 108 to avoid over or under allocation of the logical/hardware resources. In an embodiment, during pre-deployment, the O-ICC 204 receives the request for controlling the instantiation of the IS 118 and the DMS 120, and acknowledges the request to the non-RT-RIC 206 and/or near-RT-RIC 202, then instantiates the IMS 118 and the DMS 120 at the FOCOM component 122 and the NFO 124, respectively. The O-ICC 204 uses the IMS 118 and the DMS 120 to operate the control loop 216 to minimize the latency by communication through the OC1 interface 208. In another embodiment, during software updating for the IMS 118, when all resources are reported by the FOCOM component 122 and the cloud platform 108, respectively, the O-ICC 204 is configured to perform the optimization procedures, using them O-cApp 210 configured for customer/application procedures and services, and to control the matching of the logical/hardware resources, as well as the time delay in the control loop 216. Further, this step includes during control by the O-ICC 204, when the DMS 120 allocates the resources according to the NF deployment request, once the O-ICC 204 receives DMS and ME reports, the O-ICC 204 controls the logical/hardware resources to reduce the latency using the minimum resources in the cloud platform 108. During control by the O-ICC 204, the O-ICC 204 requests the release of any extra logical/hardware resources if the initial allocation is over-resourced or requests an increase in the logical/hardware resources in a case that the allocated logical/hardware resources are below the level of required logical/hardware resources.

Step 606 also includes adding and removing, by the O-ICC 204, the RAN nodes 106 within the restricted loop time. This step also includes orchestrating, by the O-ICC 204, control for virtualized base station functionalities within the cloud platform 108.

At step 608, the method 600 includes controlling, by the non-RT-RIC 206, the RAN logical/hardware resource allocation in non real-time.

At step 610, the method 600 includes controlling, by the near-RT-RIC 202, the RAN logical/hardware resource allocation in near real-time.

At step 612, the method 600 includes directly communicating, using OC1 Interface 208, messages between the O-ICC 204 and both the non-RT-RIC 206 and the near-RT-RIC 202.

Figure 7:
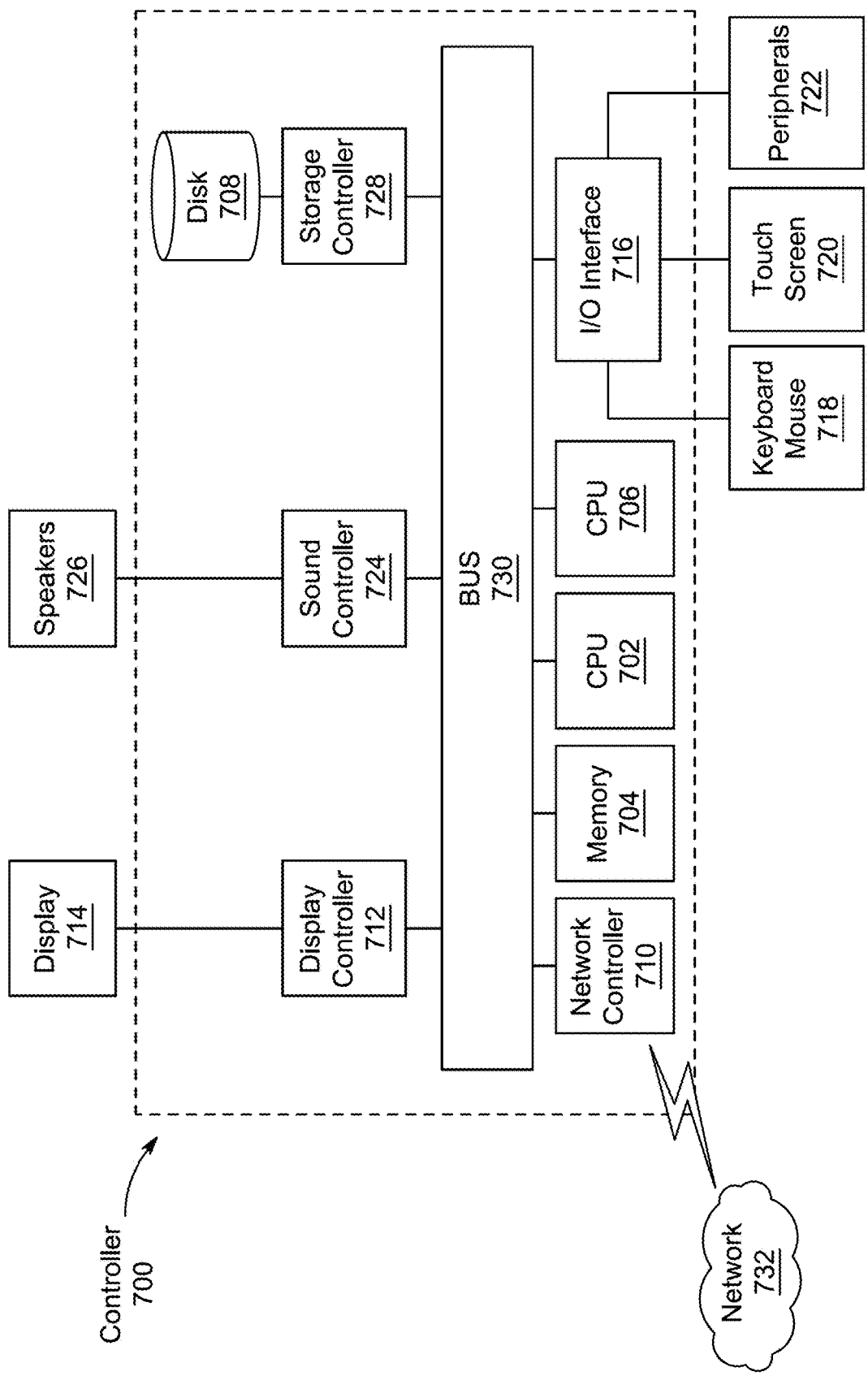
FIG. 7 is an illustration of a non-limiting example of details of computing hardware used in a computing system, according to certain embodiments.

Next, further details of the hardware description of the computing environment according to exemplary embodiments are described with reference to FIG. 7. In FIG. 7, a controller 700 is described as representative of the system 100 of FIG. 1 in which the controller 700 includes a CPU 702 which performs the processes described above/below. The process data and instructions can be stored in a memory 704. These processes and instructions can also be stored on a storage medium disk 708 such as a hard drive (HDD) or a portable storage medium or can be stored remotely.

Further, the present disclosure is not limited by the form of the computer-readable media on which the instructions of the inventive process are stored. For example, the instructions can be stored on compact discs (CDs), digital versatile disc (DVDs), in FLASH memory, read access memory (RAM), read only memory (ROM), programmable read only memory (PROM), erasable programmable read only memory (EPROM), electrically erasable programmable read only memory (EEPROM), hard disk or any other information processing device with which the computing device communicates, such as a server or computer.

Further, the present disclosure may be provided as a utility application, background daemon, or component of an operating system, or combination thereof, executing in conjunction with CPU 702, 706 and an operating system such as Microsoft Windows 7, Microsoft Windows 10, UNiplexed Information Computing System (UNIX), Solaris, Lovable Intellect Not Using XP (LINUX), Apple Macintosh (MAC)-Operating System (OS) and other systems known to those skilled in the art.

The hardware elements in order to achieve the computing device may be realized by various circuitry elements, known to those skilled in the art. For example, CPU 702 or CPU 706 may be a Xenon or Core processor from Intel of America or an Opteron processor from advanced micro devices (AMD) of America, or may be other processor types that would be recognized by one of ordinary skill in the art. Alternatively, the CPU 702, 706 may be implemented on a field programmable Gate array (FPGA), application-specific integrated circuit (ASIC), programmable logic device (PLD) or using discrete logic circuits, as one of ordinary skill in the art would recognize. Further, CPU 702, 706 may be implemented as multiple processors cooperatively working in parallel to perform the instructions of the inventive processes described above.

The computing device in FIG. 7 also includes a network controller 710, such as an Intel Ethernet PRO network interface card from Intel Corporation of America, for interfacing with network 732. As can be appreciated, the network 732 can be a public network, such as the Internet, or a private network such as a local area network (LAN) or a wide area network (WAN) network, or any combination thereof and can also include public switched telephone network, (PSTN) or an integrated services digital network (ISDN) sub-network. The network 732 can also be wired, such as an Ethernet network, or can be wireless, such as a cellular network including EDGE, 3G and 4G wireless cellular systems. The wireless network can also be Wireless Fidelity (WiFi), Bluetooth, or any other wireless form of communication that is known.

The computing device further includes a display controller 712, such as a NVIDIA GeForce GTX or Quadro graphics adaptor from NVIDIA Corporation of America for interfacing with display 714, such as a Hewlett Packard HPL2445w LCD monitor. A general purpose I/O interface 716 interfaces with a keyboard and/or mouse 718 as well as a touch screen panel 720 on or separate from display 714. General purpose I/O interface also connects to a variety of peripherals 722 including printers and scanners, such as an OfficeJet or DeskJet from Hewlett Packard.

A sound controller 724 is also provided in the computing device such as Sound Blaster X-Fi Titanium from Creative, to interface with speakers/microphone 726 thereby providing sounds and/or music.

The general-purpose storage controller 728 connects the storage medium disk 708 with communication bus 730, which may be an instruction set architecture (ISA), extended industry standard architecture (EISA), video electronics standards association (VESA), peripheral component interconnect (PCI), or similar, for interconnecting all of the components of the computing device. A description of the general features and functionality of the display 714, keyboard and/or mouse 718, as well as the display controller 712, storage controller 728, network controller 710, sound controller 724, and general purpose I/O interface 716 is omitted herein for brevity as these features are known.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset, as shown on FIG. 8.

Figure 8:
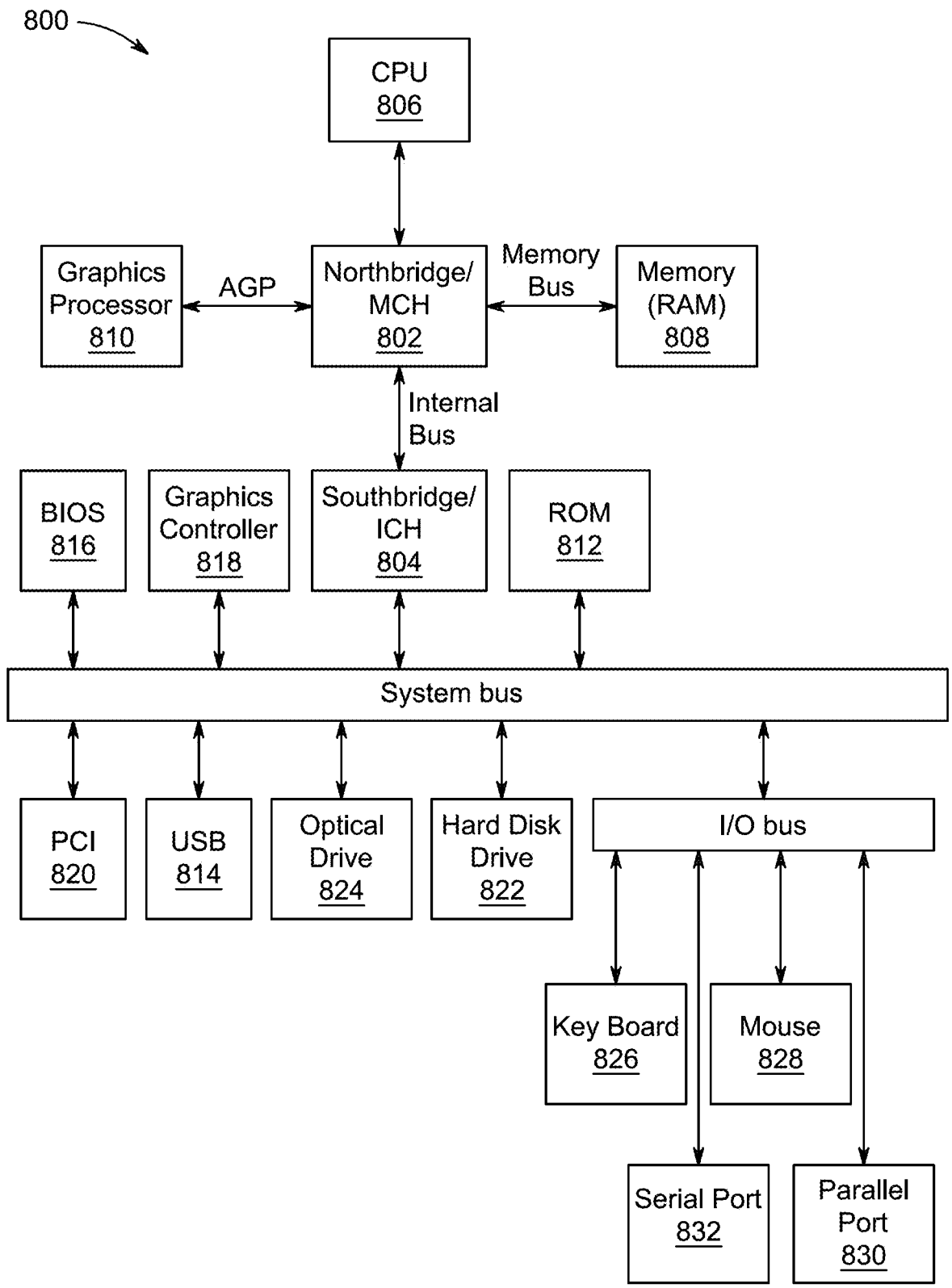
FIG. 8 is an exemplary schematic diagram of a data processing system used within the computing system, according to certain embodiments.

FIG. 8 is an exemplary schematic diagram of a data processing system 800 used within the computing system, according to certain embodiments, for performing the functions of the exemplary embodiments. The data processing system 800 is an example of a computer in which code or instructions implementing the processes of the illustrative embodiments may be located.

In FIG. 8, the data processing system 800 employs a hub architecture including a north bridge and memory controller hub (NB/MCH) 802 and a south bridge and input/output (I/O) controller hub (SB/ICH) 804. The central processing unit (CPU) 806 is connected to the NB/MCH 802. The NB/MCH 802 also connects to the memory 808 via a memory bus, and connects to the graphics processor 810 via an accelerated graphics port (AGP). The NB/MCH 802 also connects to the SB/ICH 804 via an internal bus (e.g., a unified media interface or a direct media interface). The CPU 806 may contain one or more processors and even may be implemented using one or more heterogeneous processor systems.

Figure 9:
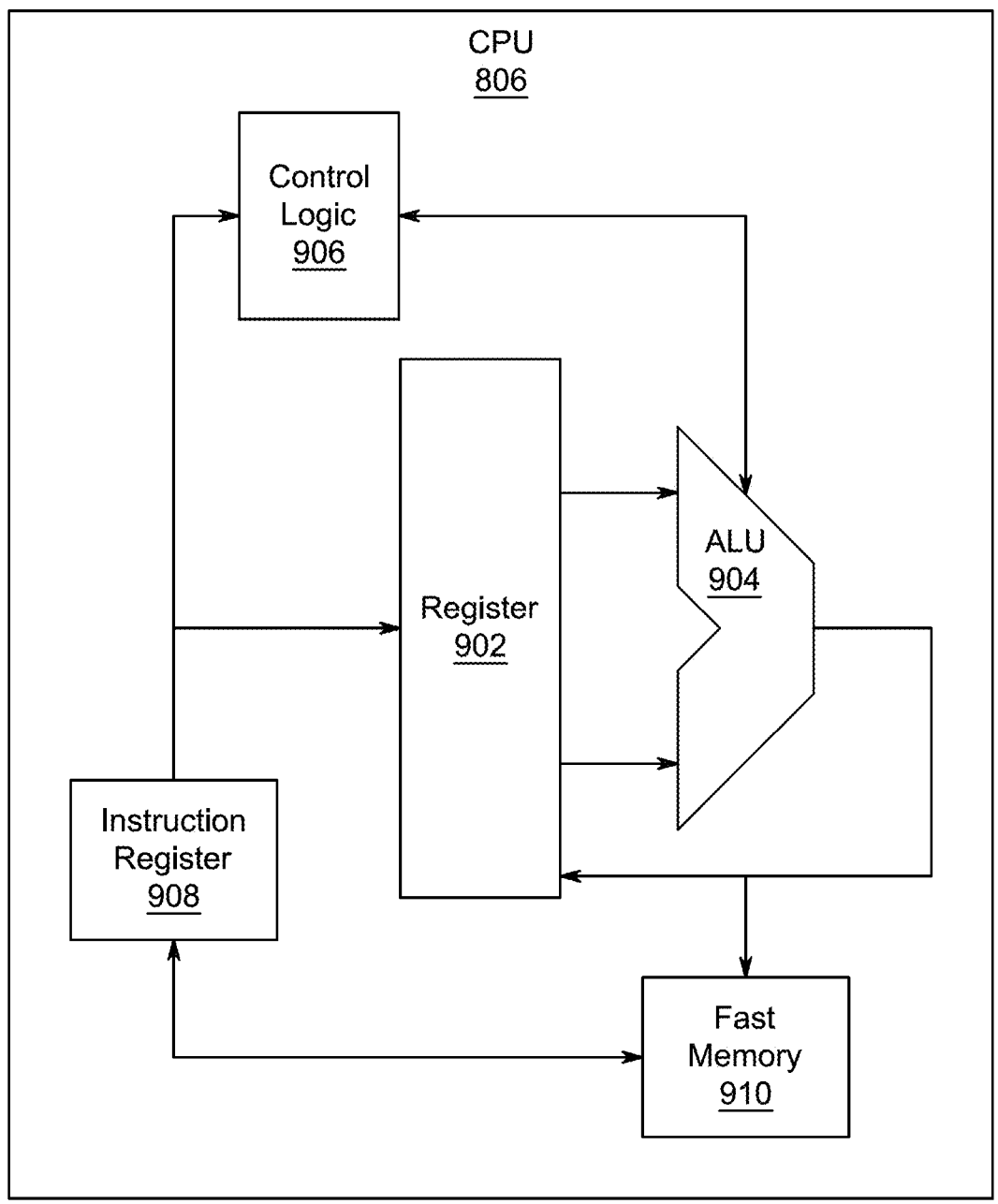
FIG. 9 is an exemplary schematic diagram of a processor used with the computing system, according to certain embodiments.

For example, FIG. 9 shows one implementation of the CPU 806. In one implementation, the instruction register 908 retrieves instructions from the fast memory 910. At least part of these instructions is fetched from the instruction register 908 by the control logic 906 and interpreted according to the instruction set architecture of the CPU 806. Part of the instructions can also be directed to the register 902. In one implementation the instructions are decoded according to a hardwired method, and in another implementation the instructions are decoded according to a microprogram that translates instructions into sets of CPU configuration signals that are applied sequentially over multiple clock pulses. After fetching and decoding the instructions, the instructions are executed using the arithmetic logic unit (ALU) 904 that loads values from the register 902 and performs logical and mathematical operations on the loaded values according to the instructions. The results from these operations can be feedback into the register 902 and/or stored in the fast memory 910. According to certain implementations, the instruction set architecture of the CPU 806 can use a reduced instruction set architecture, a complex instruction set architecture, a vector processor architecture, a very large instruction word architecture. Furthermore, the CPU 806 can be based on a Von Neuman model or a Harvard model. The CPU 806 can be a digital signal processor, the FPGA, the ASIC, the PLA, a PLD, or a CPLD. Further, the CPU 806 can be an x86 processor by Intel or by AMD; an ARM processor, a Power architecture processor by, e.g., IBM; a SPARC architecture processor by Sun Microsystems or by Oracle; or other known CPU architecture.

Referring again to FIG. 8, the data processing system 800 can include that the SB/ICH 804 is coupled through a system bus to an I/O Bus, a read only memory (ROM) 812, universal serial bus (USB) port 814, a flash binary input/output system (BIOS) 816, and a graphics controller 818. PCI/PCIe devices can also be coupled to SB/ICH 804 through a PCI bus 820.

The PCI devices may include, for example, Ethernet adapters, add-in cards, and PC cards for notebook computers. The Hard disk drive 822 and CD-ROM (optical drive) 824 can use, for example, an integrated drive electronics (IDE) or serial advanced technology attachment (SATA) interface. In one implementation the I/O bus can include a super I/O (SIO) device.

Further, the hard disk drive (HDD) 822 and optical drive 824 can also be coupled to the SB/ICH 804 through a system bus. In one implementation, a keyboard 826, a mouse 828, a parallel port 830, and a serial port 832 can be connected to the system bus through the I/O bus. Other peripherals and devices that can be connected to the SB/ICH 804 using a mass storage controller such as SATA or PATA, an Ethernet port, an ISA bus, a LPC bridge, SMBus, a DMA controller, and an Audio Codec.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry, or based on the requirements of the intended back-up load to be powered.

Figure 10:
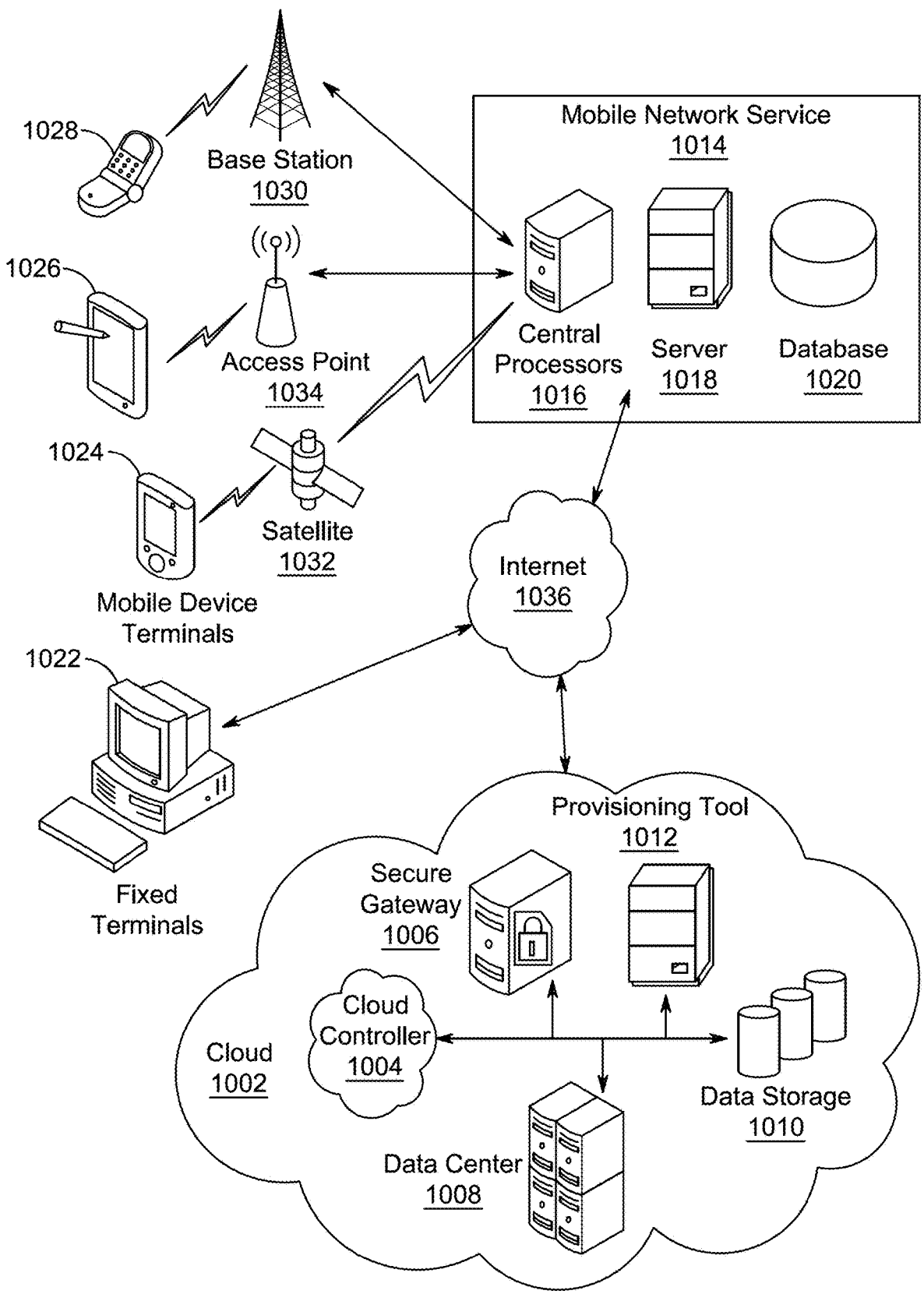
FIG. 10 is an illustration of a non-limiting example of distributed components which may share processing with the controller, according to certain embodiments.

The functions and features described herein may also be executed by various distributed components of a system. For example, one or more processors may execute these system functions, wherein the processors are distributed across multiple components communicating in a network. The distributed components may include one or more client and server machines, such as cloud 1002 including a cloud controller 1004, a secure gateway 1006, a data center 1008, data storage 1010 and a provisioning tool 1012, and mobile network services 1014 including central processors 1016, a server 1018 and a database 1020, which may share processing, as shown by FIG. 10, in addition to various human interface and communication devices (e.g., display monitors 1022, smart phones 1024, tablets 1026, personal digital assistants (PDAs) 1028). The network may be a private network, such as a base station 1030, satellite 1032 or access point 1034, or be a public network, may such as the Internet 1036. Input to the system may be received via direct user input and received remotely either in real-time or as a batch process. Additionally, some implementations may be performed on modules or hardware that are not identical to those described. Accordingly, other implementations are within the scope of the present disclosure.

The above-described hardware description is a non-limiting example of corresponding structure for performing the functionality described herein.

Numerous modifications and variations of the present disclosure are possible in light of the above teachings. It is therefore to be understood that the invention may be practiced otherwise than as specifically described herein.

The invention claimed is:

1. A system for minimizing and/or re-scaling communication latency and resources respectively in cloud, Open and/or virtual based radio access network RAN (C/O/v-RAN), comprising:
   a RAN Node including one or more antennas, one or more radio units, and one or more baseband, O-CU and O-DU,
   wherein the one or more antennas receive data transmissions from a plurality of user devices and send the data to a radio unit of the one or more radio units, the radio unit converts a signal from an antenna of the one or more antennas into a digital format that a baseband unit can understand, the baseband unit of the one or more baseband units sends data from the RAN Node to a cloud platform, and sends data received from the cloud platform to the radio unit for transmission;
   a near real time RAN intelligent controller (Near-RT-RIC) for near-RT control of logical/hardware resource allocation in the RAN Node; and
   a service management and orchestration (SMO) framework including:
   a Open Intelligent Cloud Controller (O-ICC) for controlling operations in the cloud platform,
   a non-real-time RIC (Non-RT-RIC) for non real-time control of the RAN logical/hardware resource allocation, and
   an open cloud interface (OC1 Interface) to enable direct communication of messages between the Open Intelligent Cloud Controller (O-ICC) and both the Non-RT-RIC and the Near-RT-RIC,
   wherein the cloud platform is configured with
      an infrastructure management service (IMS) and a deployment management service (DMS),
      wherein the Open Intelligent Cloud Controller (O-ICC) is configured to control the IMS and the DMS in order to reduce latency of a cloud platform control loop, and
   wherein during pre-deployment the Open Intelligent Cloud Controller (O-ICC) is configured to
   receive a request for controlling instantiation of the IMS and the DMS, and
   acknowledge the request to the Non-RT-RIC and/or the near RT-RIC, then instantiate the IMS and the DMS by a Federated O-Cloud Orchestration & Management (FOCOM) component and network function orchestration (NFO), respectively,
   wherein the O-ICC uses the IMS and the DMS to operate the control loop to minimize the latency by communication through the open cloud interface (OC1 Interface).

2. The system of claim 1, wherein the SMO includes one or more cloud Apps (o-cApps) which are configured for customer/application procedures and services.

3. The system of claim 1, wherein the Open Intelligent Cloud Controller (O-ICC) is further configured to control the IMS and the DMS for allocating logical/hardware resources to different software entities of the cloud platform to avoid over or under allocation of the logical/hardware resources.

4. The system of claim 1, wherein during software updating for the IMS, when all resources are reported by the FOCOM component and the cloud platform, respectively, the O-ICC is configured to perform optimization procedures, using a cloud App to control matching of the logical/hardware resources, as well as time delay in the cloud platform control loop.

5. The system of claim 1, wherein during control by the Open Intelligent Cloud Controller (O-ICC), when the DMS allocates the resources according to a network function (NF) deployment request, once the O-ICC receives DMS and Managed Element (ME) reports, the Open Intelligent Cloud Controller (O-ICC) is further configured to control the logical/hardware resources to reduce the latency using minimum resources in the cloud platform.

6. The system of claim 1, wherein during control by the cloud intelligent controller (O-ICC), the O-ICC is further configured to request release of any extra logical/hardware resources if an initial allocation is over-resourced or request increase in the logical/hardware resources in a case that the allocated logical/hardware resources are below a level of required logical/hardware resources.

7. The system of claim 1, wherein the Open Intelligent Cloud Controller (O-ICC) is configured to add and remove RAN nodes within a restricted loop time.

8. The system of claim 1, wherein the Open Intelligent Cloud Controller (O-ICC) is configured to orchestrate control for virtualized base station functionalities within the cloud platform.

9. A method of minimizing communication latency in a cloud-based radio access network (RAN), comprising:
communicating wirelessly between user devices and a baseband unit in a RAN Node;
sending data from the baseband unit to a cloud platform;
controlling, by a Open Intelligent Cloud Controller (O-ICC), operations in the cloud platform;
controlling, by a non-real-time RAN intelligent controller (Non-RT-RIC), RAN logical/hardware resource allocation in non real-time;
controlling, by a near real time RAN intelligent controller (Near-RT-RIC), the RAN logical/hardware resource allocation in near real-time;
directly communicating, using an open cloud interface (OC1 Interface), messages between the Open Intelligent Cloud Controller (O-ICC) and both the Non-RT-RIC and the Near-RT-RIC; and
controlling, by the Open Intelligent Cloud Controller (O-ICC), an infrastructure management service (IMS) and a deployment management service (DMS) in order to reduce latency of a control loop in controlling the cloud platform,
wherein during pre-deployment the cloud intelligent controller (O-ICC)
receives a request for controlling instantiation of the IMS and the DMS, and
acknowledges the request to the Non-RT-RIC and/or the Near-RT-RIC, then instantiates the IMS and the DMS at a Federated O-Cloud Orchestration & Management (FOCOM) component and network function orchestration, respectively,
wherein the O-ICC uses the IMS and the DMS to operate the control loop to minimize the latency by communication through the open cloud interface (OC1 Interface).

10. The method of claim 9, further comprising configuring one or more cloud Apps (o-cApps) for customer/application procedures and services.

11. The method of claim 9, further comprising controlling, by the Open Intelligent Cloud Controller (O-ICC), the IMS and the DMS for allocating logical/hardware resources to different software entities of the cloud platform to avoid over or under allocation of the logical/hardware resources.

12. The method of claim 9, wherein during software updating for the IMS, when all resources are reported by the FOCOM component and the cloud platform, respectively, the O-ICC is configured to perform optimization procedures, using a cloud App to control matching of the logical/hardware resources, as well as time delay in the control loop.

13. The method of claim 9, wherein during control by the Open Intelligent Cloud Controller (O-ICC), when the DMS allocates the resources according to a network function (NF) deployment request, once the O-ICC receives DMS and Managed Element (ME) reports, the O-ICC controls the logical/hardware resources to reduce the latency using minimum resources in the cloud platform.

14. The method of claim 9, wherein during control by the Open Intelligent Cloud Controller (O-ICC), the O-ICC requests release of any extra logical/hardware resources if an initial allocation is over-resourced or requests increase in the logical/hardware resources in a case that the allocated logical/hardware resources are below a level of required logical/hardware resources.

15. The method of claim 9, further comprising adding and removing, by the Open Intelligent Cloud Controller (O-ICC), the RAN nodes within a restricted loop time.

16. The method of claim 9, further comprising orchestrating, by the Open Intelligent Cloud Controller (O-ICC), control for virtualized base station functionalities within the cloud platform.

* * * * *